(12) United States Patent
Tao et al.

(10) Patent No.: US 10,761,798 B2
(45) Date of Patent: Sep. 1, 2020

(54) SYSTEMS AND METHODS FOR GIMBAL SIMULATION

(71) Applicant: SZ DJI TECHNOLOGY CO., LTD., Shenzhen (CN)

(72) Inventors: Ye Tao, Shenzhen (CN); Zihan Chen, Shenzhen (CN); Zhiyuan Zhang, Shenzhen (CN); Weifeng Liu, Shenzhen (CN); Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 213 days.

(21) Appl. No.: 15/853,818

(22) Filed: Dec. 24, 2017

(65) Prior Publication Data

US 2018/0121149 A1 May 3, 2018

Related U.S. Application Data

(60) Division of application No. 15/266,877, filed on Sep. 15, 2016, now Pat. No. 9,858,023, which is a
(Continued)

(51) Int. Cl.
| | | |
|---|---|---|
| *G05D 1/00* | (2006.01) | |
| *G05D 1/10* | (2006.01) | |
| *G06F 3/14* | (2006.01) | |
| *B64C 39/02* | (2006.01) | |
| *G09B 9/08* | (2006.01) | |

(Continued)

(52) U.S. Cl.
CPC ............... *G06F 3/14* (2013.01); *B64C 39/024* (2013.01); *G05D 1/0094* (2013.01); *G06F 3/147* (2013.01); *G09B 9/08* (2013.01); *G09B 9/12* (2013.01); *G09B 9/48* (2013.01); *G09B 19/165* (2013.01); *B64C 2201/027* (2013.01); *B64C 2201/127* (2013.01); *B64C 2201/128* (2013.01);
(Continued)

(58) Field of Classification Search
None
See application file for complete search history.

(56) References Cited

U.S. PATENT DOCUMENTS

| | | |
|---|---|---|
| 7,642,741 B2 | 1/2010 | Sidman |
| 7,768,514 B2 | 8/2010 | Pagan |

(Continued)

FOREIGN PATENT DOCUMENTS

| | | |
|---|---|---|
| CN | 102023644 A | 4/2011 |
| CN | 102176161 A | 9/2011 |

(Continued)

OTHER PUBLICATIONS

The World Intellectual Property Organization (WIPO) International Search Report and Written Opinion dated for PCT Application No. PCT/CN2015/083788 dated Feb. 22, 2016.

*Primary Examiner* — Todd M Melton
*Assistant Examiner* — Jason R Roberson
(74) *Attorney, Agent, or Firm* — Anova Law Group, PLLC

(57) ABSTRACT

Systems, devices and methods are provided for training a user to control a gimbal in an environment. The systems and methods provide a simulation environment to control a gimbal in a virtual environment. The virtual environment closely resembles a real control environment. A controller may be used to transmit simulation commands and receive simulated data for visual display.

20 Claims, 16 Drawing Sheets

Related U.S. Application Data continuation of application No. PCT/CN2015/083788, filed on Jul. 10, 2015.

(51) Int. Cl.
    *G09B 9/12*     (2006.01)
    *G09B 9/48*     (2006.01)
    *G09B 19/16*     (2006.01)
    *G06F 3/147*     (2006.01)
    *H04L 29/08*     (2006.01)

(52) U.S. Cl.
    CPC ..... *G09G 2354/00* (2013.01); *G09G 2380/12* (2013.01); *H04L 67/125* (2013.01)

(56) References Cited

U.S. PATENT DOCUMENTS

| | | |
|---|---|---|
| 2001/0041326 A1 | 11/2001 | Zeier |
| 2007/0050139 A1 | 3/2007 | Sidman |
| 2010/0152953 A1* | 6/2010 | Hamilton ............... B64G 1/244 701/31.4 |
| 2011/0264427 A1 | 10/2011 | Shumaker et al. |
| 2012/0143482 A1 | 6/2012 | Goossen et al. |
| 2013/0060405 A1 | 3/2013 | Komatsuzaki et al. |
| 2014/0327764 A1 | 11/2014 | Nelson et al. |
| 2016/0313736 A1* | 10/2016 | Schultz .................. B64D 47/08 |

FOREIGN PATENT DOCUMENTS

| | | |
|---|---|---|
| CN | 102314179 A | 1/2012 |
| CN | 102496312 A | 6/2012 |
| CN | 103177609 A | 6/2013 |
| CN | 103267528 A | 8/2013 |
| CN | 103426282 A | 12/2013 |
| CN | 103458184 A | 12/2013 |
| CN | 204406748 U | 6/2015 |
| EP | 2341387 A1 | 7/2011 |
| JP | H0875396 A | 3/1996 |
| JP | 2001021297 A | 1/2001 |
| JP | 2008206670 A | 9/2008 |
| JP | 2009275952 A | 11/2009 |
| WO | 2007033033 A2 | 3/2007 |
| WO | 2015014116 A1 | 2/2015 |

* cited by examiner

SYSTEMS AND METHODS FOR GIMBAL SIMULATION

CROSS-REFERENCE

This application is a divisional application of U.S. application Ser. No. 15/266,877, filed on Sep. 15, 2016, which is a continuation application of International Application No. PCT/CN2015/083788, filed on Jul. 10, 2015, the content of both of which is hereby incorporated by reference in its entirety.

BACKGROUND OF THE DISCLOSURE

Flight simulators have been applied in an aviation field for many years and are helpful for training pilots or users. In general, the flight simulators may provide trainees with a virtual scene that is very similar to a real scene. Using this virtual scene and auxiliary devices, such as handheld devices, the trainees may be able to virtually experience flight control over an aerial vehicle under simulated conditions.

However, the current flight simulators mainly provide basic aircraft operating functions through software applications running on personal computers ("PCs") and fail to provide features that enable a user to practice manipulating a carrier, such as a gimbal, for unmanned aerial vehicles ("UAVs"). The gimbal couples a camera to a UAV to allow the UAV to perform a variety of tasks, including, for example, aerial surveys, aerial imaging, aerial photographs and the like. This lack of gimbal simulation does not permit the user to train in advance to learn to skillfully control the gimbals.

SUMMARY OF THE DISCLOSURE

A need exists to provide a method of training a user to control flight of an unmanned aerial vehicle (UAV) in a simulated environment. Provided herein are systems and methods to simulate gimbal control.

Thus, in one aspect, a method of simulating gimbal control is provided. The method comprises: receiving, (1) gimbal control data from a remote control system configured to communicate with the gimbal control system and (2) position data describing a simulated attitude of the vehicle; generating, at a gimbal control system, simulated gimbal response data based on the gimbal control data and the position data describing the simulated attitude of the vehicle; and transmitting, to the remote control system, the simulated gimbal response data from the gimbal control system on-board the vehicle.

In another aspect, a gimbal simulation system is provided. The gimbal simulation system comprises: a gimbal on-board a vehicle; a gimbal control system on-board the vehicle configured to (1) receive gimbal control data from a remote control system, (2) receive position data describing a simulated attitude of the vehicle generated from a vehicle control system on-board the vehicle; and (3) generate simulated gimbal response data based on (i) the gimbal control data and (ii) the position data describing the simulated attitude of the vehicle; and a communication unit configured to transmit the simulated gimbal response data to the remote control system.

In another aspect, a method of simulating gimbal control is provided. The method comprises: receiving, at a remote control system remote to a vehicle, simulated gimbal response data generated by a gimbal control system on-board the vehicle, wherein the simulated gimbal response data is generated based on (1) gimbal control data from the remote control system configured to communicate with the gimbal control system and (2) position data describing an attitude of the vehicle generated from a vehicle control system on-board the vehicle; and displaying, at the remote control system, a simulated gimbal representation based on the simulated gimbal response data.

In another aspect, a non-transitory computer readable media comprising program instructions for performing a gimbal simulation is provided. The non-transitory computer readable media comprises: program instructions for processing simulated gimbal response data received at a remote control system remote to the vehicle, said simulated gimbal response data generated by a gimbal control system on-board the vehicle, wherein the simulated gimbal response data is generated based on (1) gimbal control data from the remote control system configured to communicate with the gimbal control system and (2) position data describing an attitude of the vehicle generated from a vehicle control system on-board the vehicle; and program instructions for displaying, at the remote control system, a simulated gimbal representation based on the simulated gimbal response data.

In another aspect, a method of simulating gimbal control is provided. The method comprises: receiving a gimbal mode signal indicative of a selection from a plurality of gimbal modes; receiving (1) gimbal control data from a remote control system and (2) position data describing a simulated attitude of the vehicle generated from a vehicle control system on-board the vehicle; and generating, at the gimbal control system, simulated gimbal response data based on (1) the gimbal control data, (2) the position data describing the simulated attitude of the vehicle, and (3) the gimbal mode signal, wherein the simulated gimbal response data causes a different set of axes to be stabilized with respect to an environment of the vehicle under each of the plurality of gimbal modes.

In another aspect, a gimbal on-board a vehicle is provided. The gimbal comprises: a receiver configured to receive a gimbal mode signal indicative of a selection from a plurality of gimbal modes; and a gimbal control system configured to (1) receive gimbal control data from a remote control system, (2) receive position data describing a simulated attitude of the vehicle generated from a vehicle control system on-board the vehicle and (3) simulated gimbal response data based on (1) the gimbal control data, (2) the position data describing the simulated attitude of the vehicle, and (3) the gimbal mode signal, wherein the simulated gimbal response data causes a different set of axes to be stabilized with respect to an environment of the vehicle under each of the plurality of gimbal modes.

In another aspect, a method of operating a gimbal on-board a vehicle is provided. The method comprises: receiving a gimbal mode signal indicative of whether the gimbal is to be in an active mode or a simulation mode; receiving gimbal control data from a remote control system; and generating, at the gimbal control system, gimbal response data based on the gimbal control data from the remote control system, wherein the gimbal response data is (1) communicated to one or more actuators configured to adjust an arrangement of the gimbal when the gimbal is in the active mode and is (2) not communicated to one or more actuators when the gimbal is in the simulation mode.

In another aspect, a gimbal on-board a vehicle is provided. The gimbal comprises: a receiver, configured to receive a gimbal mode signal indicative of whether the gimbal is to be in an active mode or a simulation mode; a gimbal control system configured to (1) receive gimbal control data from a remote control system, and (2) gimbal response data based on the gimbal control data from the remote control system; and one or more actuators configured to (1) adjust an arrangement of the gimbal when the gimbal is in the active mode, or (2) remain dormant and not adjust the arrangement of the gimbal when the gimbal is in the simulation mode.

In another aspect, a method of simulating gimbal control is provided. The method comprises: receiving, (1) gimbal control data from a remote control system configured to communicate with the gimbal control system and (2) position data describing a simulated attitude of the vehicle; generating, at a gimbal control system, simulated gimbal response data based on the gimbal control data and the position data describing the simulated attitude of the vehicle; and transmitting, to a display device, the simulated gimbal response data and the simulated attitude of the vehicle, wherein the display device generates a visual depiction based on the simulated gimbal response data and the simulated attitude of the vehicle.

In another aspect, a gimbal simulation system is provided. The gimbal simulation system comprises: a gimbal on-board a vehicle; a gimbal control system on-board the vehicle configured to (1) receive gimbal control data from a remote control system, (2) receive position data describing a simulated attitude of the vehicle generated from a vehicle control system on-board the vehicle; and (3) generate simulated gimbal response data based on (i) the gimbal control data and (ii) the position data describing the simulated attitude of the vehicle; and a communication unit configured to transmit, to a display device, the simulated gimbal response data and the simulated attitude of the vehicle, wherein the display device generates a visual depiction based on the simulated gimbal response data and the simulated attitude of the vehicle.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
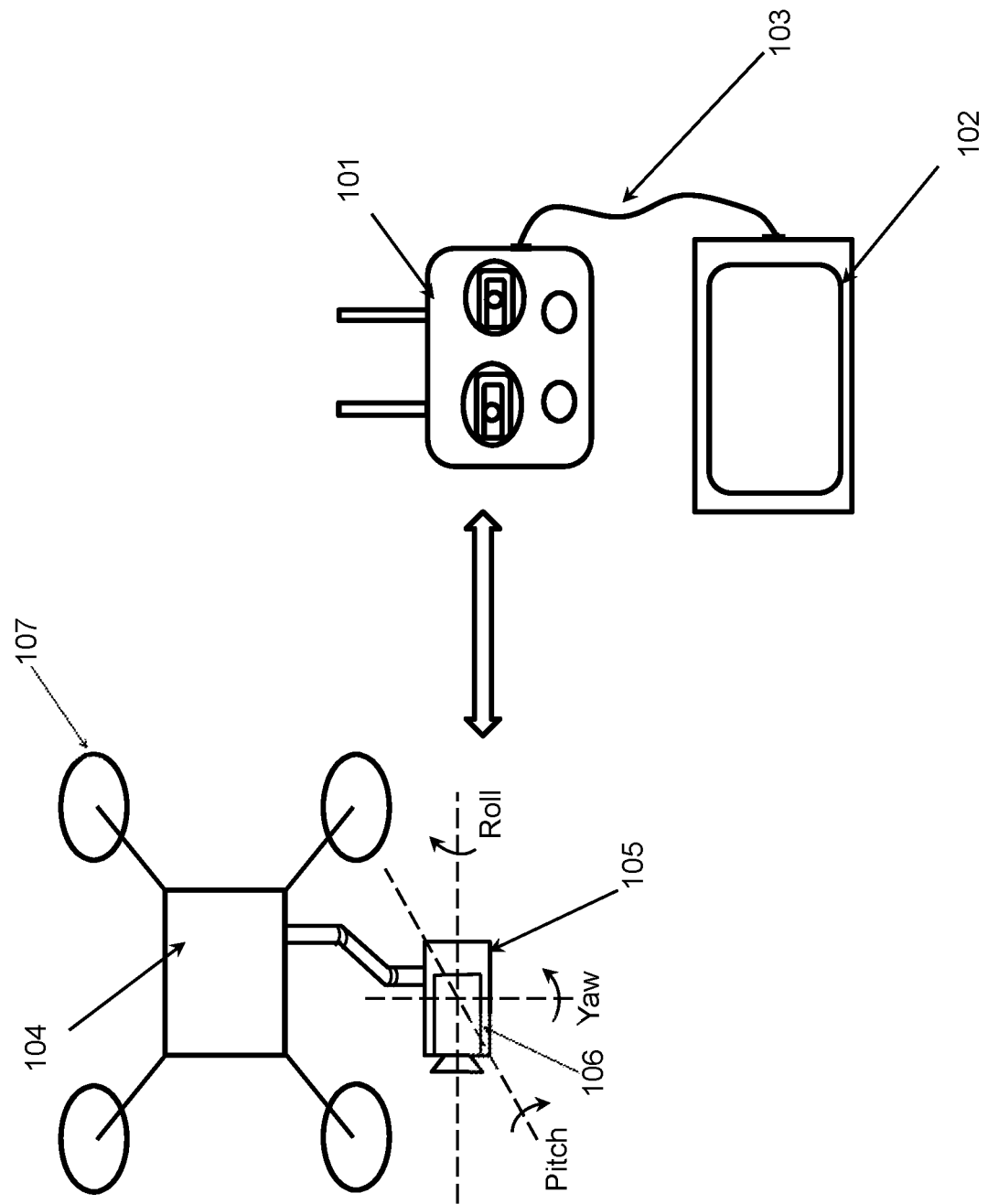
FIG. 1 illustrates an example system architecture in accordance with an embodiment of the disclosure.

The systems, devices, and methods of the disclosure provide mechanisms for training a user to manipulate and control a carrier, which may be a gimbal in a virtual or simulated environment. The gimbal may be supported by a vehicle, such as an unmanned aerial vehicle ("UAV"), and may be used to support a payload. The payload may be an imaging device, which may be used for aerial photography. The gimbal simulation may occur while the vehicle is not moving in a real environment (e.g., the UAV is not flying in a real environment). The gimbal simulation may occur while the gimbal is or is not moving. The skills and experiences obtained by the user from manipulating the gimbal in the virtual environment may be directly applicable to manipulate a gimbal in a real environment. The systems, devices, and methods described herein further provide a simulation platform that employs at least some components that may be used for real manipulation of the gimbal. Description of the UAV may be applied to any other type of unmanned vehicle, or any other type of movable object.

One or more functions of the gimbal may be controlled at least partially by an input from a user. The input from the user may be provided to the gimbal through a remote controller. The remote controller may be used to control flight of the UAV in a real flight environment. The remote controller may be used to control movement of a gimbal of the UAV and/or payload of the UAV in a real flight environment. Providing input to control one or more functions of the gimbal through the remote controller may be difficult to novice users. In some cases, a user that is unfamiliar with providing input to control one or more functions of the gimbal through the remote controller may fail to achieve a desired result using the remote controller. Failure to achieve good manipulation of the gimbal using the remote controller may result in failure to accommodate movement of the vehicle in a real flight and make it impossible to achieve desired aerial photography. Therefore, it may be advantageous to provide a simulation exercise in which a user can train and practice controlling a real gimbal in a virtual environment using a controller system.

In some cases, a virtual or simulated environment may be an outdoor, indoor environment, or mixed outdoor and indoor environment where a gimbal may be independently operated, or operated in combination with a UAV to which the gimbal is coupled. The operations of the gimbal in the virtual environment may be virtual operations of the gimbal. Virtual operations of the gimbal may or may not include real rotation of one or more gimbal components about one or more axes. In some instances, virtual operation of the gimbal may include only virtual rotation of the one or more gimbal components about one or more axes. An orientation of a payload supported by the gimbal may be controlled about one, two, three or more axes. Such control may occur in a real environment or in a virtual environment.

A virtual or simulated environment may be a representation of a real environment that exists in real time and space and may be tangible in a physical world. In some instances, data collected regarding a real environment may be used to formulate the virtual or simulated environment. For instance, one or more sensors may collect data about a real environment. Data from the sensors may be used to aid in formulating the virtual or simulated environment. An individual may physically interact with a real environment. Further, a virtual or simulated environment may be a mixture of a simulated environment in a computer software structure and a real environment in a vehicle, such as a UAV. A virtual or simulated environment may be created from one or more inputs from a user, software developer, or information from a database. A virtual or simulated environment may be a representation of an environment that exists in real space and time or an imaginary environment that does not exist in real space and time. A virtual or simulated environment may comprise defined boundaries, obstacles, and surfaces. The virtual or simulated environment may have defined medium to support manipulation of the gimbal, for example, the medium may be air. The medium may exist and be defined mathematically in the virtual environment. In some embodiments, the virtual environment does not exist in the physical, tangible world.

A remote controller that is configured to control a real gimbal in a virtual or simulated environment may be the same or similar to a controller that is used to control a real gimbal in a real environment. In some instances, the simulation remote controller may be the same actual remote controller that is used to control the gimbal in a real environment. In some instances, the simulation remote controller may be an exact duplicate or replica of the remote controller that is used to control the gimbal in a real environment. Any description of a same remote controller may also apply to a duplicate or replica, or type of remote controller. In some instances, the simulation remote controller may have one or more features that are identical to the actual remote controller used to control the gimbal in a real environment. The simulation remote controller may or may not have one or more features that are different from the actual remote controller used to control the gimbal in a real environment. Providing the same controller for use in both the simulation and the real environment may result in a more realistic training experience for a user. A user may develop muscle memory associated with movement or manipulation of a physical interface on a remote control. Providing an identical remote controller in both a simulation mode and an active mode of a gimbal may provide the advantage of utilizing the muscle memory formed in the simulation mode for use in the active mode, in which the gimbal may be physically coupled to the UAV and moving an imaging device carried by the gimbal for aerial photography when the UAV takes off and flies in a space. The muscle memory may increase reaction time, precision, and accuracy when the gimbal is in the active mode. Providing the same controller for use in both the simulation and active modes of the gimbal may familiarize a user with the sensitivity of the controls on the remote control. For example, a user may become familiar with the response time of the gimbal to an input from the remote control. In another example, a user may become familiar with the magnitude of a response relative to movement of a physical interface on a remote control. Additionally, a user may memorize the location of knobs, buttons, joysticks, and/or dials on a remote controller in a simulation mode. As a consequence, when the gimbal is in the active mode, the memorized location of these components may increase reaction time and therefore increase a user's ability to control the gimbal.

In some cases, a UAV, gimbal, and/or payload may be configured to perform autonomous tasks. The autonomous tasks may occur during the gimbal simulation and/or during active operation of the gimbal. An autonomous task may be initiated by a user, for example, instructing the UAV, gimbal, and/or payload to enter into a gimbal simulation procedure. After an autonomous task is initiated by a user, the UAV, gimbal, and/or payload may not require additional control or input from a user while the autonomous task is performed. An autonomous task may cause the UAV to enter a predetermined sequence. The predetermined sequence may include a series of actions that do not require user input. For instance, the UAV may enter a predetermined flight sequence. This may include an automated takeoff sequence, an automated landing sequence, or a predetermined or semi-determined flight path relative to an environment (virtual or real) or relative to a reference point (e.g., ground station, destination point). Another example of an autonomous task for a UAV may include operation of one or more sensors that may collect information about an environment of the UAV. In another example, the autonomous task may include communication tasks. The autonomous tasks may relate to operation of the gimbal and/or payload of the UAV. In an example, an autonomous task may be instruction of the gimbal to enter into a simulation mode, and/or instruction of the gimbal to exit a simulation mode. The autonomous task may include transmissions of position data (real or virtual) of the UAV to the gimbal in the simulation mode. The autonomous task may include stabilizing a payload on the gimbal in accordance with one or more stabilization modes. The autonomous task may include tracking a (real or virtual) target with the payload. The autonomous task may include any function of the payload, such as turning the payload on or off, entering a different image capture mode (e.g., video vs. still, filtering, color, and lighting), zooming, or any other function.

A gimbal simulation may or may not be coupled with a vehicle motion simulation. For instance, if a gimbal is supported by a UAV, the gimbal simulation may be coupled with a flight simulation of the UAV. The user may have virtual control of the gimbal and/or the UAV during a simulation. In some instances, the user may have virtual control of the gimbal without virtual control of the UAV. For instance, the UAV may autonomously fly during the simulation, while the user practices controlling the gimbal alone. In other instances, the user may control both flight of the UAV and operation of the gimbal to simulate situations when the user will be operating both.

Position of the UAV may affect operation of the gimbal. For instance, an orientation of a payload may be affected by a configuration of the gimbal and an orientation of the UAV. Similarly, a location of the payload in space may be affected by a configuration of the gimbal and a location of the UAV in space (e.g., spatial coordinates). Information about a UAV position (real or virtual) may be used in aiding the gimbal simulation.

The position data herein may include simulated aircraft attitude data which is descriptive of attitudes of the UAV in a simulation mode, such as attitude data about a pitch axis, attitude data about a roll axis, and attitude data about a yaw axis, which may be respectively represented as pitch_aircraft, roll_aircraft, and yaw_aircraft. The position data may include simulated aircraft spatial location data which may include a location of a UAV in a space in a simulation mode, such as a latitude, longitude, and/or altitude. Simulated aircraft data may include any type of position data. In some cases, the simulated aircraft data may be derived from real data of the UAV in flight or from one or more prior flights. The simulated aircraft data may alternatively not be based on real position data and may be made up as part of the flight simulation data. The simulated data may or may not depend on an input from a user to control a virtual flight of the aircraft. In some cases, the simulated data may be generated randomly by a computing device through a position data generator running on the computing device. In some cases, the simulated aircraft data may be semi-static position data that has been stored by the user in the storage of a computing device, such as a personal computer (PC) or a mobile device, and may be updated periodically according to the recent real position data of the UAV. In some cases, the simulated aircraft data may be stored directly in a memory at any location for use in a simulation. The memory may be on-board the UAV, on-board the gimbal, on-board a payload, on-board a remote controller, on-board a separate device (e.g., server), or part of a cloud-computing infrastructure. The simulated aircraft data may include any type of aircraft positional data (e.g., attitude data, spatial location data).

During a simulation a user may practice controlling operation of a gimbal. The user may directly control virtual operation of the gimbal by providing one or more input that directly corresponds to a reaction by the gimbal. For instance, a user may control how one or more gimbal components may rotate. The user may directly be controlling a rotation of a payload about a pitch, yaw, and/or roll axis. A user input may directly correspond to a rotation of the payload about one or more axis. A user may control how much the gimbal component rotates to yield a corresponding payload rotation, how fast the rotation is, or an acceleration of the rotation.

A user may indirectly control virtual operation of the gimbal by providing one or more input that may cause the gimbal to react. For instance, the input may cause the gimbal to perform an autonomous task without further intervention or input by the user. In one example, the input may cause the gimbal to automatically track an object. The payload may remain aimed at the object even when the UAV position may change. The gimbal may automatically compensate for the change in the UAV position.

In some cases, a user may practice instructing a gimbal to perform an autonomous task. The instruction to perform an autonomous task may be provided to the gimbal in a simulation mode via an identical interface as the interface used in the active mode. The interface may be a remote controller. The autonomous task may establish communication links with a UAV or with an external computing device or storage to receive simulated aircraft attitude data. The autonomous task may further perform data fusion directed to combining the position data including the simulated aircraft attitude data of the UAV and gimbal control data of the gimbal so as to obtain simulated gimbal response data of the gimbal.

A gimbal simulation may or may not make use of actual gimbal data. A remote controller may communicate with the physical gimbal. Data about the physical gimbal may be used to aid the simulation. The data may include gimbal attitude information, as described further herein. The gimbal attitude information may include an attitude of a payload supported by the gimbal. The gimbal attitude information may include an attitude of one or more gimbal components. The data may include information about signals that are sent to one or more actuators of a gimbal. The data may include information about feedback from one or more actuators of the gimbal. In some instances, virtual gimbal data may be used instead of or in addition to actual gimbal data. For example, virtual gimbal attitude information may be provided based on signals from the remote controller to control one or more actuators of the gimbal. Signals from the physical gimbal may or may not be used in the generation of the virtual gimbal attitude information, or any other type of virtual gimbal data.

The gimbal control data of the gimbal may include real attitude data of the gimbal that is collected or sampled when the gimbal is in operation. For example, the real attitude date of the gimbal is collected in real-time or near real-time when the gimbal is rotating about one or more of a pitch axis, a roll axis and a yaw axis. This may occur without requiring involvement of the UAV in flight. Therefore, the real attitude data of the gimbal may be the pitch attitude data, roll attitude data and yaw attitude data of the gimbal with respect to a UAV to which the gimbal may be coupled. For example, the pitch attitude data, the roll attitude data and the yaw attitude data may be respectively represented as pitch_gimbal_real, roll_gimbal_real, and yaw_gimbal_real.

Gimbal control data may include actual gimbal data and/or virtual gimbal data. The gimbal control data may be combined with UAV position data. The UAV position data may be UAV virtual position data such as attitude and/or location. The data may be combined at simulation generation system. The simulation generation may include one or more processors. The simulation generation system may be provided on-board the UAV, on-board the gimbal, on-board the payload, on-board the remote controller, on-board a remote device, in a cloud-computing infrastructure, or distributed over any combination.

In some cases, these real attitude data of the gimbal may be transmitted to a remote controller for data fusion with position data including the simulated attitude data of the UAV.

In some cases, the gimbal control data and position data of the UAV may be synchronized with each other in a time domain such that the resulting simulated gimbal response data of the gimbal is much closer to the real environment and therefore the user may obtain a better training effect. The user commands may be sent to the gimbal, which may or may not physically respond, but which may result in gimbal response data being sent back. By utilizing the physical gimbal, the gimbal response data may be more realistic in timing and/or substance of response. The simulated gimbal response data may be represented pitch_gimbal, roll_gimbal, and yaw_gimbal, denoting relative positions of the gimbal with respect to a UAV-body coordinate frame, or denoting absolute positions of the gimbal with respect to an earth-surface inertial reference frame.

The gimbal control simulation may use a display device to depict a virtual simulated environment of the gimbal. An application may run on a display device. The display device may be part of a remote controller that may control operation of the gimbal. The display device may be a separate device from the remote controller. The display device may or may not communicate with the remote controller. The display device may optionally be detachably mounted on the remote controller, or have a shared substrate with the remote controller. The display device may be physically separated from the remote controller and may or may not wirelessly communicate with the remote controller. The display device and remote controller may be part of a remote control system.

The application may cause the display to show a three-dimensional virtual environment. The virtual environment may be shown from a third party view that may also show the UAV and/or gimbal. The virtual environment may be shown from a perspective of an imaging device supported by the gimbal. The display device may show movement of the gimbal within the environment. This may be shown from a perspective outside the gimbal which may show how the various gimbal components may move relative to one another and/or the environment. Further, the application may also show a video image dynamically varied with the resulting simulated attitude data of the gimbal. In some instances, the display device may simultaneously show multiple views. For instance, the multiple views may include a view from a perspective outside the UAV and/or gimbal, and a view from the imaging device's perspective. In this manner, the manipulation performed by the user on the gimbal may be visualized and the user may be able to intuitively adjust the movement of the gimbal such that desired images or pictures may be captured in this simulation environment.

As previously described, a vehicle control system on-board a vehicle may be used to control movements or attitudes of the vehicle. When the vehicle is a UAV, then the vehicle control system may be a flight control system that may be used to control flight of the UAV within the virtual or simulated environment. The vehicle control system may be part of a simulation generation system. The vehicle control system may include one or more processors. The vehicle control system may be on-board the UAV, on-board the display device, on-board the payload on-board the remote controller, on-board a separate device, part of a cloud computing infrastructure, or distributed any of these. The vehicle control system may use data from virtual sensors or real sensors to generate a simulated flight and simulated attitude data of the UAV. In some instances, a UAV may operate within a flight mode or a simulated mode. When in the flight mode, the UAV flight control system may send signals to propulsion units of the UAV to effect flight of the UAV. When in a simulated mode, the UAV flight control system may send signals to a physical model without sending signals to the propulsion units. The physical model may provide virtual feedback, which may help define the simulated flight of the UAV. The same flight control system may be used during real flight of the UAV and simulated flight of the UAV.

Further, as previously described, a remote control system may be used to control movements of the gimbal within the virtual or simulated environment. The remote control system may include a remote controller configured to accept a user input to effect control of the gimbal. The remote control system may be configured to communicate with a gimbal control system on-board the UAV and/or gimbal. The remote control system may also be configured to receive the simulated attitude data of the UAV and transmit the simulated attitude data of the gimbal to a display device for visual display. The simulation generation system may or may not be the remote control system. The simulation generation system may be on one or more separate devices from the remote control system.

Provided herein are systems, methods, and devices configured to provide a realistic gimbal simulation. A realistic gimbal simulation may be a simulation for gimbal control that comprises components used in a real operation of a gimbal. Possible components of a realistic gimbal simulation system are shown in FIG. 1. A realistic gimbal simulation system may comprise a remote controller 101, a display device 102, a connector 103 between the remote controller and the display device, a vehicle 104, such as a UAV, a gimbal 105 supported by the vehicle, and a payload, such as an image capture device 106 supported by the gimbal.

A remote control system may communicate with a gimbal control system. The remote control system may include a remote controller and/or a display device. As illustrated, the remote controller and display device may be separate devices. The remote controller and display device may be connected to one another via a connector. The connector may be a flexible cable. The remote controller and display device may be directly connected to one another. The remote controller and display device may be removably directly connected to one another or permanently connected to one another. The remote controller and display device may be indirectly connected to one another via one or more intermediary devices. The remote controller and display device may be removably indirectly connected to one another or permanently connected to one another. The remote controller and display device may be physically separated from one another. The remote controller and display device may be in communication with one another. The remote controller and display device may be in communication via a hard-wired connection or via wireless connections. In some instances, direct wireless communications may be provided. Alternatively, indirect wireless communications may be provided, such as communications with one or more intermediary devices (e.g., base stations, satellites, towers), or over a network. The remote controller and display device may be the same device. A remote controller may both accept inputs to affect operation of the UAV and/or gimbal and display information pertaining to the simulation. The remote control system may encompass a single device or multiple devices.

The remote controller may be used to control operation of a gimbal in an active mode or simulation mode. The remote controller may be the same remote controller that is used to control a UAV in a real flight operation or in a simulation mode. In some cases the remote controller may be a similar or identical copy of a remote controller that is used to control a gimbal and/or a UAV in a real flight operation. The remote controller may have any combination of physical user interface mechanisms. A physical user interface mechanism may be a component on the remote controller that a user touches or manipulates to control at least one function of the gimbal and/or UAV. In an example, a physical user interface mechanism may be a button, a joystick, a lever, a roller ball, a touch screen, a switch, a dial, or a knob. The physical interface may include one or more inertial sensors that may measure an attitude of the remote controller. In some cases, the physical user interface may comprise two or more joysticks. The joysticks may move vertically and/or horizontally. The joysticks may move both vertically and horizontally The joysticks may be used to control pitch, roll, and yaw and therefore the physical user interface mechanisms may be configured such that a user can control movement of the gimbal about a roll, yaw, and/or pitch axis as depicted in FIG. 1. The physical user interface mechanisms may be further configured to provide a user control over operations of the gimbal and/or UAV in the simulated environment. In some embodiments, one or more controls may be used for controlling the gimbal and the UAV. The controls may be physical or virtual controls. For example, the physical controls may be the same set of joysticks that may be used to control the gimbal and the UAV and the virtual controls may be virtual direction keys for controlling the gimbal and the UAV. In other embodiments, different sets of joysticks may be used to control the gimbal and the UAV. Similarly, the same physical user interface may be used to control the gimbal and the UAV. Alternatively, different physical user interfaces may be used to control the gimbal the UAV. The same remote controller may be used to control the gimbal and the UAV. In some embodiments, a gimbal remote controller and a UAV remote controller may be provided as separate devices. The gimbal remote controller and the UAV remote controller may or may not be physically connected to one another. The gimbal remote controller and the UAV remote controller may or may not be in communication with one another. A gimbal remote controller and a UAV remote controller may be configured to be operated simultaneously by the same user. Alternatively, the gimbal remote controller and the UAV remote controller may be configured to be operated by different users simultaneously. In some instances, for gimbal simulation, only controls for the gimbal are provided. Alternatively, controls for both the gimbal and the UAV may be provided.

In some cases, the physical user interface may provide mechanisms to control non-flight actions of the UAV. A non-flight action may be movement of a sensor or payload on-board the UAV. The non-flight action may also include actuation of a gimbal of the UAV that may be configured to carry a payload. Another example of a non-flight action can be collection and/or reporting of the simulated attitude data previously collected by a sensor on-board the UAV. Additionally, the physical user interface may provide mechanisms to initiate an autonomous action or task by the UAV. In an example, an autonomous task or action may be transmissions of the position data including the simulated attitude data by the UAV to a remote control system in the remote controller. In some embodiments, controlling the operations of the gimbal 105 may include controlling rotational acceleration of one or more components of the gimbal, rotational speed of one or more components of the gimbal, attitudes of one or more components of the gimbal, and/or power to the gimbal or more components of the gimbal.

In accordance with some embodiments, the remote controller may connect to a display device through a wired or wireless connection. Any other configuration or relation of the remote controller and display device may be provided, as previously described.

The display device may be a device that comprises a computing component and a visual display. The computing component may comprise one or more processors, and one or more memory storage devices. The processors may be configured to execute instructions in accordance with non-transitory computer readable medium. The memory may comprise non-transitory computer readable media comprising code, logic, or instructions for performing one or more steps described herein. The display device may comprise a non-transitory computer readable media comprising program instructions for performing a gimbal control simulation. The display device may be a mobile device, such as a smart phone. In some cases, the display device may be a desktop computer, laptop computer, tablet, or virtual reality headset. Alternatively, the display device may be a combination of a computing component and a visual display where a visual display may be a touchscreen, projector, LCD screen, plasma screen, LED or OLED screen, a television, or a monitor.

The display device may provide a visual and/or textual representation of simulated attitude data of the gimbal during a gimbal control simulation. In some cases, the display device may additionally provide audio feedback during a gimbal control simulation. The display device may be configured to receive user input through a user interactive component, such as a touchscreen, switch, button, key, knob, mouse, pointer, trackball, joystick, touchpad, inertial sensors (e.g., accelerometers, gyroscopes, magnetometers) microphone, visual sensor, or infrared sensor. The user interactive component may receive touch inputs, positional inputs, audio inputs, or visual inputs.

The remote controller may be in communication with the display device. Communication between the remote controller and the display device may be provided through a wired or wireless connection. A wireless connection may be provided between the remote controller and the display device through an RF connection, IR connection, Wi-Fi network, a wireless local area network (WLAN), a cellular network, or any other available wireless network. Additionally or alternatively, a wired connection may be provided between the remote controller and the display device through a permanent wire connection, coaxial cable connection, Firewire connection, MIDI connection, eSTATA connection, an Ethernet connection, or any other available wired connection that permits data transmission. In some cases, the wired connection may be a connection through a USB cable 103 via USB ports. In some cases, the display device is integrated in the remote controller and become a part of the remote controller. Therefore, it would be easy for the user to observe the simulation of the gimbal control by merely holding the remote controller.

In some embodiments, the remote controller and/or the display device may be in communication through a wired or wireless connection with a vehicle control system or flight controller. The vehicle control system may be on-board or off-board the UAV. In some embodiments, the vehicle control system may be on-board the remote controller or the display device. The vehicle control system may be configured to generate position data describing a simulated attitude of the UAV in response to an input from the remote controller and/or the display device. The position data may or may not include a simulated spatial location of the UAV. The vehicle control system may receive input from a user through the remote controller and/or the display device. The vehicle control system may communicate the input to a system of one or more components that may generate real or virtual sensor data and communicate this data back to the vehicle control system. Based on the real or virtual sensor data, the vehicle control system may generate position data, such as simulated attitude data of the UAV, and transmit this simulated data to the simulation generation system.

The remote control system may be remote to the UAV and/or the gimbal. The remote control system may be remote to the gimbal control system. The location of the UAV and/or the gimbal may be independent of the location of the remote control system. In some instances, there may be a limited range between the UAV and/or gimbal and the remote control system. Alternatively, there may be no limit to the range between the UAV and/or gimbal and the remote control system.

The remote controller and/or the display device may be in communication through a wired or wireless connection with a gimbal control system. The gimbal control system may be on-board or off-board the gimbal and/or UAV. In some embodiments, the gimbal control system may be on-board the remote controller or the display device. The gimbal control system may be configured to generate position data describing a simulated attitude of the payload or one or more gimbal components in response to an input from the remote controller and/or the display device. The attitude information may be with respect to a virtual environment or the UAV. The gimbal control system may receive input from a user through the remote controller and/or the display device. The gimbal control system may communicate the input to a system of one or more components that may generate real or virtual sensor data and communicate this data back to the gimbal control system. Based on the real or virtual sensor data, the gimbal control system may generate position data, such as simulated attitude data of the gimbal, and transmit this simulated data to the simulation generation system. The gimbal may or may not be moving in response to the user inputs.

The simulation generation system may include the remote controller. The simulation generation system may be at any other device, as described elsewhere herein, or distributed over multiple devices. At the simulation generation system, data may be combined to generate simulated gimbal response data. The simulated gimbal response data may include the simulated attitude data of the gimbal. The simulated attitude data of the gimbal may be respect to the environment. The simulated UAV position information may be combined with the simulated gimbal position information (e.g., with respect to the UAV) to generate the simulated gimbal response data. The following will describe the method of obtaining position data including simulated attitude data of the UAV and gimbal control data including the real attitude data of the gimbal.

The UAV may be operated in a first or second operation mode. In the first operation mode, the UAV may fly in a real environment by receiving instructions or input from a remote controller 101. Hence, the first operation mode may be a flight mode or active mode.

The second operation mode may be a simulation mode. In a second operation mode, the UAV may remain physically dormant and may not be self-propelled within the real environment. One or more propulsion units 107 of the UAV, may not operate while the UAV is in the simulation mode, which may be consistent with a simulation mode of the gimbal as discussed later. In the simulation mode, one or more components on-board the UAV may contribute to a gimbal control simulation.

When the UAV is operating in a flight mode, the remote controller may provide an input to the vehicle control system. The input provided by the remote controller may be flight control data. Flight control data may be an instruction that changes a flight path or causes a flight event to start or stop. In an example, flight control data may be an instruction to start a propulsion system, stop a propulsion system, increase power to a propulsion system, decrease power to a propulsion system, change the heading of a UAV, change the elevation of the UAV, turn on a sensor on a UAV, turn off a sensor on a UAV, report sensor data from a sensor on-board the UAV, or initiate an autopilot function on the UAV. The vehicle control system may receive and process the flight control data using one or more processors. The processors may be configured to, individually or collectively, transform the flight control data into an instruction to alter, initiate, or cease a flight action. The processors may transform the flight control data identically in both flight and simulation modes of operation.

When the UAV 104 is in the flight mode, the flight control data may be communicated to one or more propulsion units of the UAV. A vehicle control system (e.g., on-board the UAV) may be configured to generate one or more flight signals to be communicated to the one or more propulsion units when the UAV is in the flight mode. When the UAV is in the flight mode, the one or more propulsion units may be configured to actuate and permit flight of the UAV in response to the flight signals. The one or more propulsion units may further be configured to remain dormant and not permit flight of the UAV when the UAV is in the simulation mode in which the one or more propulsion units may not receive a flight signal.

Optionally, in a flight mode, the remote controller may be configured to control actuation of a carrier, such as the gimbal that holds a payload of the UAV. The gimbal may be permanently affixed to the UAV or may be removably attached to the UAV. The gimbal may include one or more gimbal components that may be movable relative to one another. The gimbal components may rotate about one or more axis relative to one another. The gimbal may include one or more actuators that effect rotation of the one or more gimbal components relative to one another. The actuators may be motors. The actuators may permit rotate in a clockwise and/or counter-clockwise direction. The actuators may or may not provide feedback signals as to the position or movement of the actuators. In some instances, one or more gimbal component may support or bear the weight of additional gimbal components. In some instances, gimbal components may permit rotation of a payload about a pitch, yaw, and/or roll axis. A gimbal component may be permit rotation about a pitch axis, another gimbal component may permit rotation about a yaw axis, and another gimbal component may permit rotation about a roll axis.

The gimbal may support a payload. The payload may be permanently affixed to the gimbal or may be removably attached to a gimbal. The payload may be supported by a gimbal component. The payload may be directed connected to the gimbal component. The payload may remain at a fixed position relative to the gimbal component Alternatively, the payload may rotate relative to the gimbal component.

A payload may be an external sensor, for example a camera unit including the image capture device. The image capture device may be movable independent of the motion of the UAV. The image capture device may be movable relative to the UAV with aid of the gimbal. Similar to the propulsion units, when the UAV is in the flight mode, a carrier, payload, sensor, and/or other component of the UAV may receive, from one or more control systems on-board the UAV a variety of control signals which may cause corresponding operations directed to the carrier, payload, sensor, and/or other component. When the UAV is in the simulation mode, a user may practice controlling direction of a camera on-board the UAV without practically activating the UAV to take off. When the gimbal is in a simulation mode, the user may practice controlling direction of the camera without practically activating the gimbal to rotate. Alternatively, in the simulation mode, the gimbal may still rotate.

In some embodiments, the UAV may participate in the gimbal control simulation. When the user desires to simulate gimbal control, the UAV and/or gimbal may be turned on by a user instruction from the remote controller. The gimbal control system or the vehicle control system may transmit the position data, which may include simulated attitude data of the UAV and/or simulated attitude data of the gimbal to a simulation generation system. The simulation generation system may include the remote control system in the remote controller. At the simulation generation system, data fusion could be performed for generating the simulated gimbal response data. Alternatively or additionally, the simulation generation system may include a gimbal control system on-board the gimbal and/or the UAV and then the resulting simulated gimbal response data may be transmitted to the remote control system via a wired or wireless connection as discussed before. The remote control system may include the remote controller and/or the display device 102. The simulated gimbal response may be displayed on the display device.

In some embodiments, the UAV may comprise a receiver configured to receive a mode signal that indicates that the UAV is in a first or second mode. The mode signal may be provided by the remote controller, the display device, or a separate device in communication with the receiver. In some cases, the signal may be provided through a hardware component on the UAV. The hardware component may be manipulated by a user to provide the signal to the UAV. For example, the hardware component may be a switch, button, or knob that may be physically displaced between a first and second position to provide a signal indicating a first or second mode. In another example, a flight mode may be a default mode for the UAV and the UAV may operate in the flight mode unless a mode signal indicates a change to the simulation mode in which the UAV operates to facilitate the gimbal control simulation. As described previously, the UAV may transmit its simulated position data to a simulation generation system (e.g., remote control system, gimbal control system). Additionally or alternatively, the simulation generation system may be on-board the UAV, and the UAV may perform data fusion on its own based on the gimbal control data received from the remote controller.

The gimbal may or may not have a separate receiver configured to receive a mode signal that indicates whether the gimbal is in the first mode or the second mode. The mode signal may be provided by the remote controller, the display device, or a separate device in communication with the gimbal receiver. In some cases, the signal may be provided through a hardware component on the gimbal. The hardware component may be manipulated by a user to provide the signal to the gimbal. For example, the hardware component may be a switch, button, or knob that may be physically displaced between a first and second position to provide a signal indicating a first or second mode. In another example, an active mode may be a default mode for the gimbal and the gimbal may operate in the active mode unless a mode signal indicates a change to the simulation mode. In some embodiments, a UAV may automatically communicate a mode selection to the gimbal. The gimbal mode may be automatically updated to match the UAV mode. For instance, if the UAV is in a flight mode, the gimbal may automatically be in active mode. If the UAV is in a simulation mode, the gimbal may also be in a simulation mode.

In some embodiments, none of the components on-board the UAV may be used in the gimbal control simulation. For example, in a simulation mode, a virtual UAV may be flown in a virtual or simulated environment and therefore the position data including the simulated attitude data of the UAV may be obtained or generated in such an environment. The virtual UAV and the virtual environment may exist mathematically in a virtual or simulated space, such as one established in a computer environment. The virtual UAV may have the same functionality in the virtual environment as the real UAV in the real environment. In other words, a real UAV is not required to implement the simulation for gimbal control. The gimbal control simulation may be implemented in many different and flexible ways without the real UAV as long as the position data that includes the simulated attitude data of the UAV is available. The simulated attitude data of the UAV may or may not come from a real UAV. The simulated attitude data for the UAV may or may not be generated by a vehicle control system of the UAV. The simulated attitude data for the UAV may be generated with aid of one or more processors based purely on a virtual UAV.

In some embodiments, the gimbal 105 may be operated in a first operation mode or a second operation mode. In the first operation mode, the gimbal may be supported by the UAV 104 and may support an image capture device 106. Further, the gimbal may have been turned on and ready for carrying the image capture device for aerial photography rather than performing simulation operations. Optionally, the image capture device may be powered on when the gimbal is in the first operation mode. The image capture device may be configured to communicate captured images in a streaming manner in the first operation mode. Therefore, the first operation mode of the gimbal herein may be an active mode.

In the second operation mode, the gimbal 105 may or may not be supported by the UAV 104. Further, the gimbal may or may not support the image capture device. Although the gimbal may adjust its arrangement and in some embodiments, if the image capture device is mounted, drive the image capture device to rotate and move by one or more actuators arranged on the gimbal, the movements of the gimbal herein are merely intended to yield the gimbal control data including the real attitude data of the gimbal rather than engendering the image capture device to perform practical aerial photography. In other words, the second operation mode of the gimbal is a simulation mode in which the gimbal control data including the real gimbal attitude data of the gimbal may be collected for generating the simulated gimbal response data. This may provide realistic feedback for the user, such as how much the gimbal will end up physically moving in response to a user input. The simulated UAV attitude data may be used in combination in generating the simulated gimbal response data. In some embodiments, the gimbal does not adjust its arrangement, and the image capture device is not rotated. Information from real sensors on-board the gimbal, may or may not be used as virtual gimbal attitude data. In some instances, communication may occur with a gimbal control system. The gimbal control system may send instructions to gimbal actuators to move in an active mode. In a simulation mode, the gimbal control system may not actually send the signal to cause the actuator to move, but may generate the signals and generate simulated gimbal attitude data.

In the second operation mode, the image capture device may or may not be powered on. In some instances, the image capture device is powered off. In the second operation mode, the image capture device may or may not be recording or streaming image data captured by the image capture device. In some instances, the image capture device is not recording or streaming the image data in the simulation mode. Instead, virtual image data may be generated and displayed at a display device. The virtual image data may be reflective of a virtual position of the image capture device within the virtual environment. The virtual position of the image capture device with respect to the virtual environment may be reflective of the simulated gimbal response data.

In some embodiments, the gimbal may include a receiver through which a user may initiate a mode switch between an active mode and a simulation mode of the gimbal. In an example, a user may choose to use the gimbal in a simulation mode. To this end, the user may provide a mode switching signal or a mode selecting signal to the receiver to indicate that the gimbal should operate in a simulation mode. The user may provide the mode switching signal via a physical interface on the gimbal (e.g. a switch, a button, a lever, or a knob). In some cases, the user may provide the mode switching signal through the remote controller via a physical interface mechanism on the remote controller. In some cases, an alternate or remote device, which may be different from the remote controller used for gimbal or UAV control, may be used to send a mode switching signal to the gimbal.

Additionally or alternatively, the display device may be used to send a mode switching signal to the gimbal. For example, when the display device is turned on, it may automatically connect to a communication unit arranged on the gimbal. The gimbal may automatically enter into the simulation mode by default whenever the display device is in communication with the gimbal. In some cases, the gimbal may not automatically enter into the simulation mode and the user may communicate a mode switching signal to the receiver arranged on the gimbal through the display device by using, for example, a touch screen on the display device.

When the receiver arranged on the gimbal receives a mode switching signal to switch the mode from the simulation mode to the active mode, the gimbal may immediately cease the simulation mode and turn into the active mode, in which the gimbal gets prepared for operation with the UAV while the UAV is in flight to perform the aerial photography via the image capture device.

Optionally, in a simulation mode, the remote controller may be configured to control actuation of a carrier (e.g., the gimbal) that holds a payload of the UAV (e.g., the image capture device). A payload may be an external sensor, for example a camera unit. The payload may be movable independent of the motion of the UAV. Optionally, in the simulation mode, the remote controller may be configured to control actuation of the carrier (e.g., the gimbal), which may or may not be physically on-board the UAV. For example, a user may practice controlling directions of a camera on-board a UAV in a gimbal control simulation using a gimbal control system that may be on-board the UAV, the gimbal, the remote controller, the display device, or other device. In another example, the user may practice controlling directions of a camera supported by a gimbal that may not be on a UAV or other vehicle. The user may thus focus on practicing the gimbal control alone without worrying about other UAV functions, or while allowing the UAV functions to be simulated.

A gimbal simulation system may be provided. The gimbal simulation system may comprise the gimbal on-board the vehicle. The gimbal simulation system may further comprise a gimbal control system on-board the gimbal, the vehicle, the payload, or any other device or component described herein. The gimbal control system may be configured to receive gimbal control data from a remote control system and receive position data describing a simulated attitude of the vehicle. The simulated position of the vehicle may be generated from a vehicle control system on-board the vehicle or may be virtually generated without requiring the physical vehicle. The simulated position may be at least partially based on a simulated orientation of the vehicle. Further, the position data describing an attitude of the vehicle from the vehicle control system on-board the vehicle may be at least partially based on simulated weather data.

In some embodiments, the position data describing an attitude of the vehicle is at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis. The position data may include a simulated spatial location of the vehicle. The simulated spatial location of the vehicle may include at least one of (1) a latitude, (2) a longitude, or (3) an altitude of the vehicle. The simulated spatial location of the vehicle may be generated based on simulated output to the propulsion units. The simulated spatial location may at be further based on simulated weather data.

The gimbal control system may generate simulated gimbal response data based on (i) the gimbal control data and (ii) the position data describing the simulated attitude of the vehicle. The gimbal control data may or may not incorporate data from the physical gimbal or the gimbal control system used to control the physical gimbal. The gimbal simulation system may additionally comprise a communication unit configured to transmit the simulated gimbal response data to the remote control system. The simulated gimbal response data herein may be generated by one or more processors. The simulated gimbal response data may be generated at a simulation generation system.

In some embodiments, the simulated gimbal response data is determined based on a gimbal mode signal. The gimbal mode signal may be generated at the remote control system remote to the vehicle. Further, the gimbal mode signal is generated in response to a user input indicating a selection of a gimbal mode from the plurality of gimbal modes. The simulated gimbal response data may be obtained by a display device comprising a visual display showing the simulated gimbal state information of the gimbal. The simulated gimbal state information includes simulated visual data captured by a camera supported by the gimbal. The remote control system may include a remote controller used to operate the vehicle and/or the gimbal in a real flight operation. The remote controller may include one or more joystick controls useful for controlling directional heading of the gimbal.

In some embodiments, the gimbal simulation system may further comprise a display device that receives the simulated gimbal response data and displays a visual illustration of the gimbal in an orientation described by the gimbal response data. The display device may be part of the remote control system. The display device may be integrated with the remote controller, may be connected to the remote controller, or may be communicating with the remote controller. The display device may be a handheld device in communication with the gimbal control system. The display device may directly communicate with the gimbal control system or may communicate with the gimbal control system through the remote controller. The remote controller may directly communicate with the gimbal control system or may communicate with the gimbal control system through the display device. The remote controller and/or display device may directly communicate with the gimbal control system or may communicate with the gimbal control system through the UAV or payload.

According to the embodiments of the disclosure, the gimbal control simulation may enable the user to be more familiar with utilization of the gimbal 105 to control the direction in which the image capture device is currently directed for aerial photography.

Figure 2:
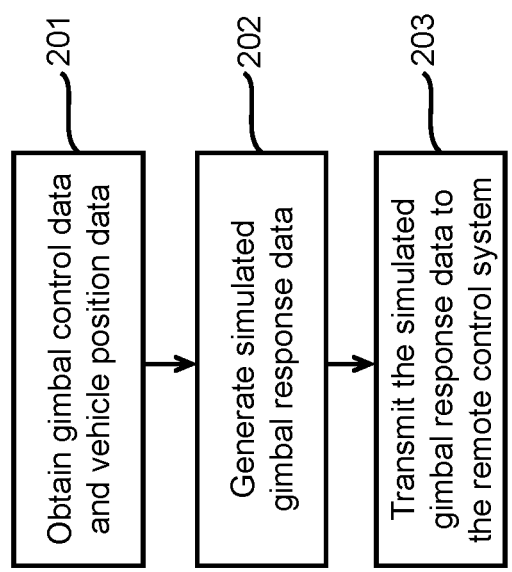
FIG. 2 illustrates an example of a simulation method in accordance with an embodiment of the disclosure.

FIG. 2 is a flow chart schematically illustrating a method of simulating gimbal control in accordance with an embodiment of the disclosure. Any of the steps are optional and/or may be performed in different orders. Any of the steps may be exchanged for other steps.

The method of simulating gimbal control may include obtaining gimbal control data and vehicle position data 201. Simulated gimbal response data may be generated based on the gimbal control data and the position data 202. The simulated gimbal response may be transmitted to a remote control system 203.

The gimbal control data and the vehicle position data may be obtained 201. The gimbal control data may be sent from a remote control system. The remote control system may be configured to communicate with a gimbal control system. The gimbal control data may be generated based on an input of a user at a remote controller of the remote control system. The input of the user may be a direct control of the gimbal or may be an indirect control of the gimbal that may initiate an automated action by the gimbal. The gimbal control data may or may not include measurements from the gimbal in response to the user input. The gimbal control data may or may not include a simulated gimbal attitude with respect to a vehicle in response to the user input. The vehicle position data may describe a simulated attitude of a vehicle. The simulated attitude of the vehicle may be generated by a vehicle control system of a vehicle, or with aid of any physical component of the vehicle. Alternatively, the simulated attitude of the vehicle may be entirely virtually generated without requiring a physical vehicle or vehicle control system of the vehicle. The vehicle position data may or may not include a simulated spatial location of the vehicle. The simulated spatial location of the vehicle may be generated by the vehicle control system of the vehicle, or with aid of any physical component of the vehicle. Alternatively, the simulated spatial location may be entirely virtually generated without requiring a physical vehicle or vehicle control system of the vehicle.

Simulated gimbal response data is generated based on the gimbal control data and the vehicle position data 202. The vehicle position data may describe the simulated attitude of the vehicle. The vehicle position data may or may not describe the simulated spatial location of the vehicle. The simulated gimbal response data may be generated at a gimbal control system. The simulated gimbal response data may be generated at a simulation generation system, which may or may not include the gimbal control system. The simulated gimbal response data may include information about position of the gimbal. The information about the position of the gimbal may be relative to a virtual environment. For instance, the virtual position of the gimbal relative to the virtual environment may be generated based on a virtual position of the gimbal relative to the UAV and a virtual position of the UAV relative to the virtual environment. The virtual positions may include attitude information and/or spatial position information. In other embodiments, the virtual position of the gimbal may be relative to the virtual environment or the UAV, and may be generated based on user input on how to control the gimbal and the virtual position of the UAV relative to the virtual environment. The virtual position of the gimbal may or may not take a previously performed calculation of the gimbal control system into account.

The simulated gimbal response data may be obtained at the remote control system 203. The simulated gimbal response data may be transmitted from the gimbal control system. The simulated gimbal response data may be transmitted from a simulation generation system, which may or may not include the gimbal control system. The simulation generation system may already be at the remote control system, which may not require separate transmission. In some embodiments, the simulated gimbal response data includes simulated gimbal state data which represents an attitude of the gimbal relative to the vehicle or the virtual environment. The simulated gimbal response data may be obtained at a remote controller and/or display device of the remote control system. The same device that may be used to control the gimbal may also comprise a visual display.

The remote control system may control the actuations, rotations and movements of the gimbal such that the gimbal control data including real attitude data of the gimbal may be obtained. The remote control system may include one or more joystick controls useful for controlling directional heading of the gimbal. Further, in some embodiments, the remote control system may comprise a computer system which may communicate with the gimbal using a wired connection or a wireless connection. The gimbal control data collected by a physical model may run on the computer system that may comprise one or more processors and one or more memory storage units. The physical model may be run in accordance with non-transitory computer readable media. The non-transitory computer readable media may comprise code, logic, or instructions for performing one or more steps described herein. The processors may, individually or collectively, execute steps in accordance with the non-transitory computer readable media. The remote control system may include a visual display. The visual display may communicate with the computer system.

In some embodiments, a visual display may show simulated gimbal state information. The simulated gimbal state information may include information about a position of a gimbal. The state of the gimbal may include whether the gimbal is on or off, a stabilization mode of the gimbal, positioning of one or more components of the gimbal, positioning of a payload supported by the gimbal, movement characteristics (e.g., speed, acceleration) of one or more components of the gimbal, or spatial position of the gimbal. The visual display may or may not show information about the vehicle. The visual display may show information about a state of the vehicle. The state of the vehicle may include whether the vehicle is on or off, positioning of the vehicle, movement characteristics (e.g., speed, acceleration) of the vehicle, power consumption of the vehicle, data collected by the sensors of the vehicle, information about operational parameters of the vehicle, information about communications of the vehicle, or navigational information of the vehicle. The visual display may or may not show information about the vehicle. The visual display may include simulated visual data captured by a camera supported by the gimbal.

The simulated visual data may be generated based on simulated position information of the gimbal. This may include simulated position information relative to the virtual environment. The simulated visual data may also depend on the simulated environment. For instance, simulated geographic features or objects may be displayed. The virtual position of the gimbal (e.g., orientation, spatial coordinates) may determine which angle the camera views the virtual environment, and thus, how the simulated visual data is displayed.

The simulated visual data may also be generated based on a stabilization mode of the gimbal. A gimbal stabilization mode may optionally be selected from a plurality of available stabilization modes. The selected gimbal stabilization mode may affect how the gimbal is virtually positioned (e.g., by determining which rotational axes the payload is stabilized/independent of vehicle movement).

In some embodiments, simulated gimbal response data may be determined according to a gimbal mode (i.e., gimbal stabilization mode), wherein the gimbal mode includes one of a first person view mode, a following mode, or a free gimbal mode. When the gimbal is operated in the first person view mode, the simulated gimbal response data stabilizes a pitch axis of the gimbal with respect to the environment without stabilizing a yaw axis and a roll axis. When the gimbal is operated in the following mode, the simulated gimbal response data stabilizes a pitch axis and a roll axis of the gimbal with respect to the environment without stabilizing a yaw axis. When the gimbal is operated in the free gimbal mode, the simulated gimbal response data stabilizes a pitch axis, a yaw axis, and a roll axis of the gimbal with respect to the environment.

It should be noted that the gimbal modes herein, including the first person view mode, the following mode, and the free gimbal mode, are only illustrative of multiple modes that the gimbal may have and the gimbal modes should not be limited to these three specific forms. A person skilled in the art may contemplate, based on the teaching of the disclosure, that the gimbal may operate in other modes and therefore the resulting simulated gimbal response data may also be used to stabilize one or more of the pitch axis, the yaw axis and the roll axis as necessary. Any of the alternative modes may stabilize one of the pitch, yaw, or roll axis, stabilize any two of the pitch, yaw, or roll axes, or stabilize all three of the pitch, yaw, and roll axes. The degree of stabilization, or response time for stabilization for any of the axes may also vary.

The simulated gimbal response data may be determined based on a gimbal mode signal. The gimbal mode signal may be generated at a remote control system. For instance, the gimbal mode signal may be generated at a remote controller that may also accept user input to control operation (virtual or real) of the gimbal. The gimbal mode signal indicates a the gimbal mode to be followed by the gimbal, such as the first person view mode, the following mode and the free gimbal mode as discussed before. Further, in some embodiments, the gimbal mode signal is generated in response to a user input indicating a selection of a gimbal mode from the plurality of gimbal modes. The user may be able to view multiple options for various modes, and may be able to select an option from the multiple options. In some instances, visual representations of the various gimbal modes may be displayed on the screen. The user may be able to touch the screen to select a desired mode, or use some sort of tracking device (e.g., mouse, joystick, trackball, touchpad, button) to select the desired mode.

The user may be able to select a gimbal operation mode while the gimbal and/or vehicle are in an active mode. Thus, when the vehicle is in motion (e.g., UAV in flight), the user may be able to select a gimbal mode that may affect the stabilization of the gimbal while in motion. The user may select a gimbal mode before the vehicle is in motion. The user may be able to select a gimbal mode while the vehicle is in motion (e.g., alter the gimbal mode from an earlier gimbal mode). The user may thus affect the type of aerial photography that may be performed while the vehicle and/or gimbal are in the active mode.

The user may be able to select a gimbal operation mode while the gimbal and/or vehicle are in a simulation mode. In the simulation mode, the operation mode of the gimbal may be selected by the user and permit the user to undergo targeted training for a specific gimbal stabilization mode. For instance, if the user wishes to practice gimbal control of a gimbal that normally operates in following mode, the user may select a following mode for the simulation and practice the gimbal control for the following mode.

The visual display may show virtual images captured by the virtual camera. This may provide feedback for a user that is practicing the gimbal mode in the simulation. Depending on the gimbal mode selected, different visual effects may be provided for the virtual images captured by the virtual camera. For instance, in the first person view mode, the image may show a stabilized pitch to retain a stabilized horizon, but may still react to the pitch and roll, much like the view from an individual that may be moving as the vehicle. In the following mode, the image may show a stabilized image about the pitch axis and a roll axis without stabilizing a yaw axis, which may give the visual effect of a pan (e.g., if the viewer was turning the viewer's head side to side). When the gimbal is operated in the free gimbal mode, the image may be stabilized about a pitch axis, a yaw axis, and a roll axis which may result in the effect that the image may be moving, but in a floating, undisturbed manner.

The camera may be supported by a gimbal that may be carried by a vehicle, such as a UAV. Any description of a UAV may apply to any type of aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

In view of the above attitude properties or characteristics, vehicle position data, which may include simulated attitude of the vehicle, may be characterized as pitch_aircraft, roll_aircraft and yaw_aircraft. The term "pitch_aircraft" is a variable descriptive of the orientation of the aircraft relative to the pitch axis. The term "roll_aircraft" is a variable descriptive of the orientation of the aircraft relative to the roll axis. The term "yaw_aircraft" is a variable descriptive of the orientation of the aircraft relative to the yaw axis. Therefore, the aircraft position data (which may include the simulated aircraft attitude data) may be represented as status_aircraft_sim=(pitch_aircraft, roll_aircraft, yaw_aircraft). As discussed before, in some embodiments, values of these variables may be obtained from the UAV in the simulation mode. For instance, these values may be supplied by a vehicle control system or a flight control system for a UAV. In some embodiments, values of these variables may be obtained from the remote control system or computer system where the values of these variables may have been previously stored for the simulation purpose. The values for these variables may be generated with aid of a computer system, without using any aircraft data.

Similarly, the gimbal control data related to the attitude data of the gimbal may be characterized as pitch_gimbal_real, roll_gimbal_real, and yaw_gimbal_real. The term "pitch_gimbal_real" is a variable descriptive of the orientation of the gimbal in the pitch axis relative to the aircraft. The term "roll_gimbal_real" is a variable descriptive of the orientation of the gimbal in the roll axis relative to the aircraft. The term "yaw_gimbal_real" is a variable descriptive of the orientation of the gimbal in the yaw axis relative to the aircraft.

As discussed before, the gimbal mode according to the embodiments of the disclosure may include a first person view mode, a following mode and/or a free gimbal mode. In each mode, the gimbal may be stabilized about various axes to allow the gimbal to remain stable. This may permit the image capture device to keep horizontal.

Figure 3:
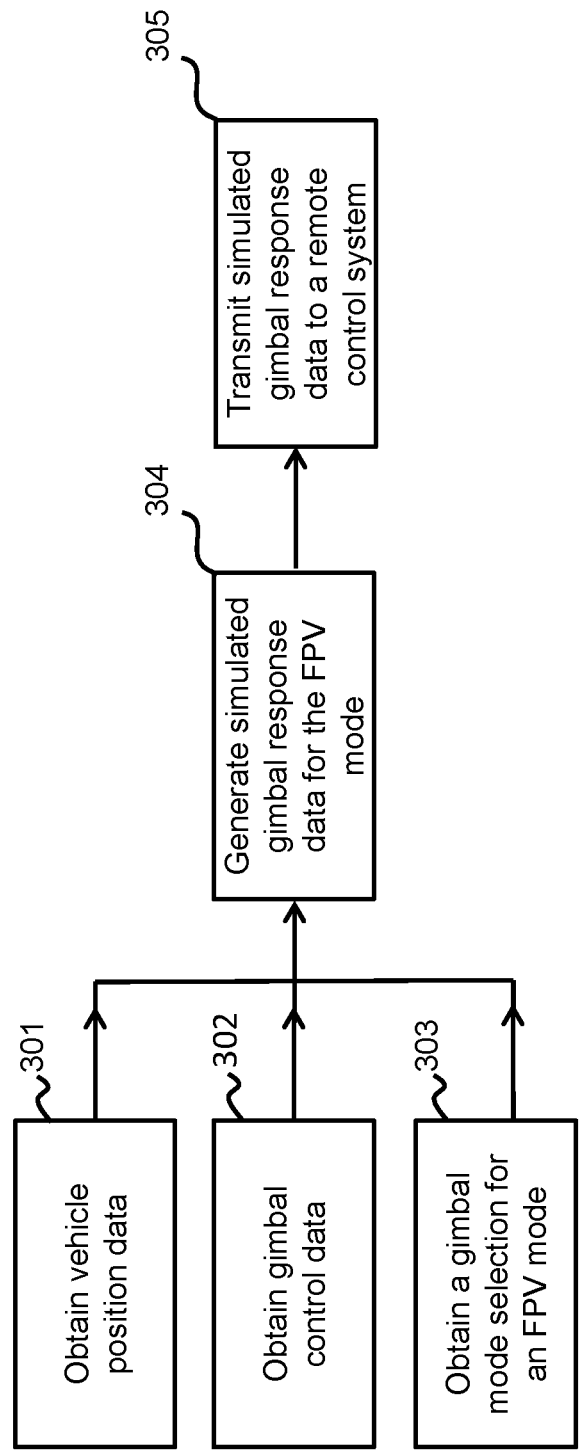
FIG. 3 illustrates an example of a simulation method under a first person view ("FPV") mode in accordance with an embodiment of the disclosure.

FIG. 3 is a flow chart schematically illustrating a method of obtaining a simulated attitude of a gimbal under a first person view ("FPV") mode in accordance with an embodiment of the disclosure.

In the FPV mode, the yaw attitude and roll attitude of a lens of the image capture device should be maintained as being consistent with an aircraft head, such as the head of the UAV. Thus, when the UAV rotates about a yaw axis or a roll axis with respect to an environment, the image capture device may correspondingly rotate with respect to the environment. The image capture device may rotate about the yaw axis or the roll axis the same amount as the UAV. Therefore, the gimbal may only need to compensate the pitch attitude to make the gimbal stable in the pitch axis. Thus, even if the UAV rotates about a pitch axis with respect to an environment (real or virtual), the image capture device does not correspondingly rotate with respect to the environment. If the image capture device does rotate about the pitch axis, the rotation would be in response to a user, instead of a stabilization effect. Thus, any rotation of the image capture device about the pitch axis relative to the environment may be independent of rotation of the UAV about the pitch axis relative to the environment. The method of obtaining the simulated attitude of the gimbal under the FPV mode may include the following steps.

The method of obtaining the simulated attitude of the gimbal may include obtaining vehicle position data 301. The gimbal control data may also be obtained 302. A selection of a FPV mode for a gimbal mode may be obtained 303. Simulated gimbal response data for the FPV mode may be generated based on the vehicle position data, the gimbal control data, and the selection of the FPV mode 304. The simulated gimbal response data may be transmitted to a remote control system 305.

The vehicle position data may be obtained 301. The vehicle position data may include the simulated attitude of the vehicle. As discussed before, the vehicle may be a UAV and the vehicle position data may be received from a flight control system on-board the UAV, or a vehicle control system on-board the vehicle, or any other system. In some embodiments, if the method is performed at the UAV, then the vehicle position data may be received from the remote control system or a separate external device (e.g., computer). As discussed before, the vehicle position data may be represented as variables pitch_aircraft, roll_aircraft and yaw_aircraft.

The gimbal control data may be obtained 302. The gimbal control data may include a real or virtual attitude of the gimbal. The gimbal control data may optionally be generated at a gimbal control system. The gimbal control data may be generated at the gimbal in real-time or near real-time and then be transmitted to the remote control system, the flight control system, the vehicle control system, or any other system described herein, for further operations based on different embodiments. As discussed before, the gimbal control data may be represented as pitch_gimbal_real, roll_gimbal_real, and yaw_gimbal_real.

A gimbal mode may be obtained 303 through, for example, a user instruction. The gimbal mode selection may include a selection of a FPV mode. A mode selecting signal may be provided from a remote control system. A user may make a selection of the FPV mode at the remote control system. Alternatively, one or more processors may select the FPV mode from other modes. A mode selecting signal may indicate which mode the user would like the gimbal to enter into. This user selection may be made by a click on a display device, such as one shown in FIG. 1, or by a push made by the user on a mode selection button on the gimbal. The selected mode may be represented as "gimbal_mode."

Simulated gimbal response data may be generated 304. The simulated gimbal response data may be generated using a data fusion algorithm. The data fusion algorithm may be launched and the vehicle position data, the gimbal control data and the gimbal mode selection may be entered into the data fusion algorithm as inputs. The resulting simulated gimbal response data, as output of the data fusion algorithm, may include the simulated attitude data of the gimbal and may be represented as yaw_gimbal, roll_gimbal, and pitch_gimbal. An exemplary data fusion algorithm may be provided as follows:

1) "yaw_gimbal" may be "yaw_gimbal_real," because the yaw attitude of gimbal would be maintained as being consistent with the yaw attitude of the aircraft head in the FPV mode. In other words, the real yaw attitude of the gimbal and the simulated yaw attitude of the aircraft may be the same;

2) "roll_gimbal" may be "roll_gimbal_real," because the roll attitude of gimbal is maintained as being consistent with the roll attitude of aircraft head in the FPV mode. In other words, the real roll attitude of the gimbal and the simulated roll attitude of the aircraft may be the same; and 3) "pitch_gimbal" may be "pitch_gimbal_real+addment (pitch_aircraft, gimbal_mode)." The function "addment( )" herein may represent a variable compensatory angle to compensate the pitch direction of the gimbal when the gimbal is in the FPV mode. For example, if the pitch_aircraft of the UAV is +10° relative to the pitch axis when the FPV mode is selected, then the value of the addment function is −10° relative to the pitch axis to offset the pitch orientation of the UAV. In this manner, the pitch direction of gimbal would be maintained stable when the UAV accelerates in a back-forth direction.

Based on the above data fusion algorithm, the simulated gimbal response data may be obtained and transmitted to a remote control system 305. In some instances, the simulated gimbal response data may be transmitted to a remote controller of the remote control system, which in turn may transmit the simulated gimbal response data to a display device for visual display. Alternatively, the simulated gimbal response data may be directly transmitted to a display device, or the display device and the remote controller may be the same device.

In some embodiments, if the data fusion algorithm herein is performed at the flight control system on-board the UAV, then the simulated gimbal response data may be transmitted from the UAV to the display device (optionally via the remote controller). In another embodiment, if the data fusion algorithm herein is performed at the remote control system, then the simulated gimbal response data may be directly transmitted from the remote controller to the display device (e.g., via a wired connection or a wireless connection). If the display device and the remote controller are integrated with each other, the simulated gimbal response data may be automatically displayed on the display of the remote controller. In other embodiments, the data fusion algorithm may be performed at a gimbal control system (e.g., on-board a gimbal or UAV), and the simulated gimbal response data may be transmitted to the remote control system. The data fusion algorithm may occur on any external device (e.g., server, cloud, other UAV), and may be transmitted to the remote control system.

The display device may comprise a screen that may depict the simulation data in a 2D or 3D rendering. The display device may be a mobile phone (e.g. smart phone), tablet, desktop computer, laptop computer, virtual reality headset, or a television or projector in communication with a computer device. In some cases, the display device may comprise a touch screen, an LCD screen, or a plasma screen.

Figure 4:
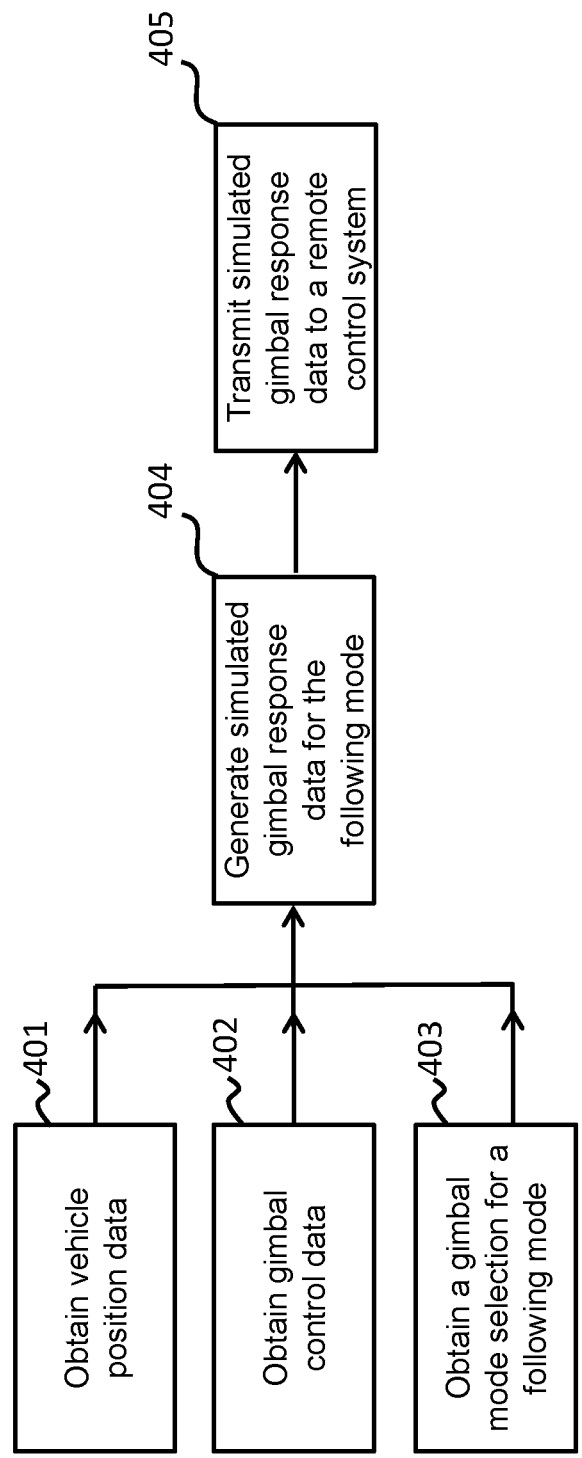
FIG. 4 illustrates an example of a simulation method under a following mode in accordance with an embodiment of the disclosure.

FIG. 4 is a flow chart schematically illustrating a method of obtaining a simulated attitude of a gimbal under a following mode in accordance with an embodiment of the disclosure.

In the following mode, the yaw attitude of a lens of the image capture device should be maintained a constant angle with respect to an aircraft head, such as the head of the UAV. Thus, when the UAV rotates about a yaw axis with respect to an environment, the image capture device may correspondingly rotate with respect to the environment with the constant angle relative to the aircraft head. The image capture device may rotate about the pitch or the roll axis the different amount than the UAV. Therefore, the gimbal may only need to compensate the pitch attitude and roll attitude to make the gimbal stable. Thus, even if the UAV rotates about a pitch axis and a roll axis with respect to an environment (real or virtual), the image capture device does not correspondingly rotate with respect to the environment. If the image capture device does rotate about the pitch axis and the roll axis, the rotation would be in response to a user, instead of a stabilization effect. Thus, any rotation of the image capture device about the pitch axis and roll attitude relative to the environment may be independent of rotation of the UAV about the pitch axis and roll attitude relative to the environment. The method of obtaining the simulated attitude of the gimbal under the following mode may include the following steps.

The method of obtaining the simulated attitude of the gimbal under the following mode may include obtaining vehicle position 401. The gimbal control data may also be obtained 402. A selection of a following mode for a gimbal mode may be obtained 403. Simulated gimbal response data for the following mode may be generated based on the vehicle position data, the gimbal control data, and the selection of the following mode 404. The simulated gimbal response data may be transmitted to a remote control system 405.

The vehicle position data may be obtained 401. The vehicle position data may include the simulated attitude of the vehicle. As discussed before, the vehicle may be a UAV and the vehicle position data may be received from the flight control system on-board the UAV, or any other system. In some embodiments, if the method is performed at the UAV, then the vehicle position data may be received from the remote control system or a separate external device (e.g., computer). As discussed before, the vehicle position data may be represented as variables pitch_aircraft, roll_aircraft and yaw_aircraft.

The gimbal control data may be obtained 402. The gimbal control data may include a real or virtual attitude of the gimbal. The gimbal control data may optionally be generated at a gimbal control system. The gimbal control data may be generated at the gimbal in real-time or near real-time and then be transmitted to the remote control system, the flight control system, or any other system described herein, for further operations based on different embodiments. As discussed before, the gimbal control data may be represented as pitch_gimbal_real, roll_gimbal_real, and yaw_gimbal_real.

A gimbal mode may be obtained 403 through, for example, a user instruction. The gimbal mode selection may include a selection of a following mode. A mode selecting signal may be provided from a remote control system. A user may make a selection of the following mode at the remote control system. Alternatively, one or more processors may select the following mode from other modes. The mode selecting signal may indicate which mode the user would like the gimbal to enter into. This user selection may be made by a click on a display device, such as one shown in FIG. 1, or by a push made by the user on a mode selection button on the gimbal. The selected mode may be represented as "gimbal_mode."

Simulated gimbal response data may be generated 404. The simulated gimbal response data may be generated using a data fusion algorithm. The data fusion algorithm may be launched and the vehicle position data, the gimbal control data and the gimbal mode selection may be entered into the data fusion algorithm as inputs. The resulting simulated gimbal response data, as output of the data fusion algorithm, may include the simulated attitude data of the gimbal and may be represented as yaw_gimbal, roll_gimbal, and pitch_gimbal. An exemplary data fusion algorithm may be provided as follows:

1) "yaw_gimbal" may be "yaw_gimbal_real+lockAircraft (yaw_aircraft, gimbal_mode, yaw_aircraft_modeClicked)," because a constant angle between the gimbal and aircraft head should be maintained, the function lockAircraft( ) may be introduced. The value of the function "lockAircraft" represents an angle between the aircraft and the yaw axis of the gimbal at the timing of enabling the following mode of the gimbal. By this angle addition, the difference of the yaw attitude of the gimbal and the yaw attitude of the UAV may be maintained in the following mode;

2) "roll_gimbal" may be "roll_gimbal_real+addment (roll_ aircraft, gimbal_mode)." The function "addment( )" herein may represent a variable compensatory angle to compensate the roll direction of the gimbal when the gimbal is in the following mode. For example, if the roll_aircraft of the UAV is +10° relative to the roll axis when the following mode is enabled, then the value of the addment function is −10° relative to the roll axis." Based on this offset operation, the roll attitude of the gimbal should be maintained as being consistent with the roll attitude of aircraft head in the following mode; and 3) "pitch_gimbal" may be "pitch_gimbal_real+addment (pitch_aircraft, gimbal_mode)." The function "addment( )" herein may represent a variable compensatory angle to compensate the pitch direction of the gimbal when the gimbal is in the following mode. For example, if the pitch_aircraft of the UAV is +10° relative to the pitch axis when the following mode is enabled, then the value of the addment function is −10° relative to the pitch axis. In this manner, the angle shift due to the entrance of the following mode could be compensated and therefore the gimbal could be maintained stable in the pitch direction.

Based on the above data fusion algorithm, the simulated gimbal response data may be obtained and transmitted to a remote control system 405. In some instances, the simulated gimbal response data may be transmitted to a remote controller of the remote control system, which in turn, may transmit the simulated gimbal response data to a display device for visual display. Alternatively, the simulated gimbal response data may be directly transmitted to a display device, or the display device and the remote controller may be the same device.

In some embodiments, if the data fusion algorithm herein is performed at the flight control system on-board the UAV, then the simulated gimbal response data may be transmitted from the UAV to the display device (optionally via the remote controller). In another embodiment, if the data fusion algorithm herein is performed at the remote control system, then the simulated gimbal response data may be directly transmitted from the remote controller to the display device (e.g., via a wired connection or a wireless connection). If the display device and the remote controller are integrated with each other, the simulated gimbal response data may be automatically displayed on the display of the remote controller. In other embodiments, the data fusion algorithm may be performed at a gimbal control system (e.g., on-board a gimbal or UAV), and the simulated gimbal response data may be transmitted to the remote control system. The data fusion algorithm may occur on any external device (e.g., server, cloud, other UAV), and may be transmitted to the remote control system.

The display device may comprise a screen that may depict the simulation data in a 2D or 3D rendering. The display device may be a mobile phone (e.g. smart phone), tablet, desktop computer, laptop computer, virtual reality headset, or a television or projector in communication with a computer device. In some cases, the display device may comprise a touch screen, an LCD screen, or a plasma screen.

Figure 5:
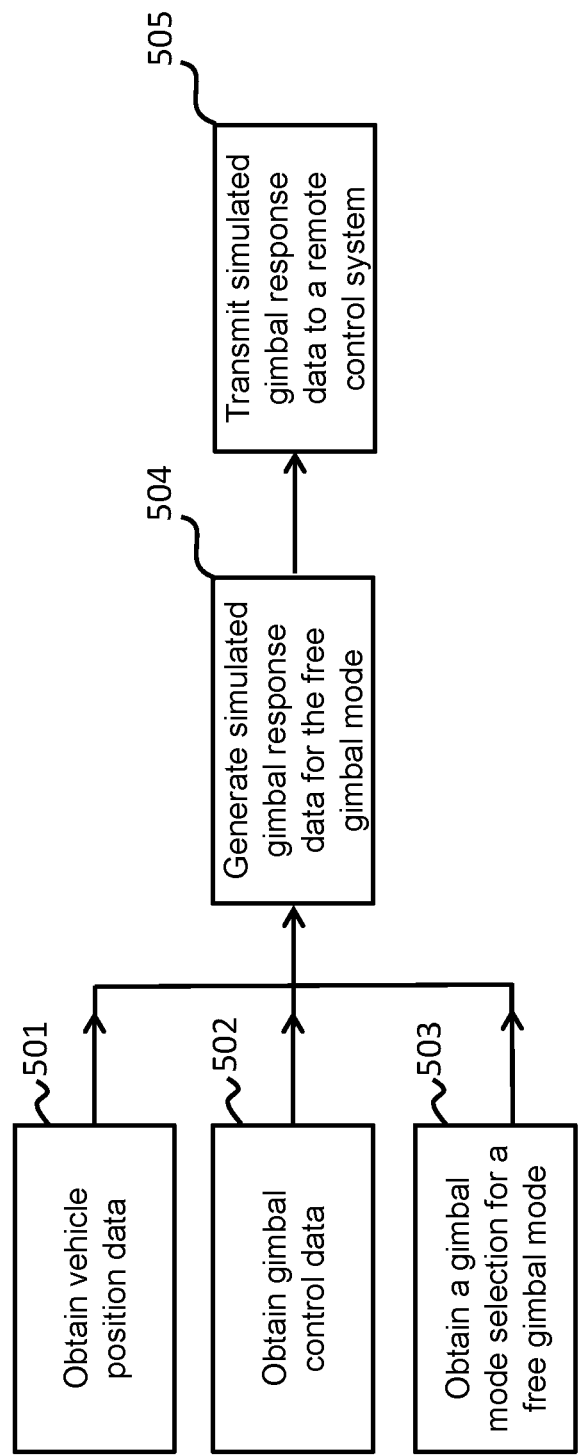
FIG. 5 illustrates an example of a simulation method under a free gimbal mode in accordance with an embodiment of the disclosure.

FIG. 5 is a flow chart schematically illustrating a method of obtaining a simulated attitudes of a gimbal under a free gimbal mode in accordance with an embodiment of the disclosure.

In the free gimbal mode, the yaw attitude of a lens of the image capture device should be locked. For example, if the lens points towards southeast when the free gimbal mode is set, then the gimbal should keep pointing toward southeast regardless of the movement of the aircraft, except that an intersection angle between the gimbal and the aircraft exceeds the limit of the gimbal. Thus, when the UAV rotates about a yaw axis, a roll axis, or a pitch axis with respect to an environment, the image capture device may not correspondingly rotate with respect to the environment. The image capture device may rotate about the yaw axis, the roll axis, or the pitch axis the different amount than the UAV. Therefore, it is required that the gimbal compensate the yaw, roll, and pitch attitudes to make itself stable. Thus, even if the UAV rotates about a pitch axis, a yaw axis, or a roll axis with respect to an environment (real or virtual), the image capture device does not correspondingly rotate with respect to the environment. If the image capture device does rotate about the pitch axis, the roll axis, or the yaw axis, the rotation would be in response to a user, instead of a stabilization effect. Thus, any rotation of the image capture device about the pitch axis, the roll axis, or the yaw axis relative to the environment may be independent of rotation of the UAV about the pitch axis, the roll axis, or the yaw axis relative to the environment. The method of obtaining the simulated attitude of the gimbal under the free gimbal may include the following steps.

The method of obtaining the simulated attitude of the gimbal may include obtaining vehicle position data 501. The gimbal control data may also be obtained 502. A selection of a free gimbal for a gimbal mode may be obtained 503. Simulated gimbal response data for the free gimbal mode may be generated based on the vehicle position data, the gimbal control data, and the selection of the free gimbal mode 504. The simulated gimbal response data may be transmitted to a remote control system 505.

The vehicle position data may be obtained 501. The vehicle position data may include the simulated attitude of the vehicle. As discussed before, the vehicle may be a UAV and the position data may be received from the flight control system on-board the UAV, or any other system. In some embodiments, if the method is performed at the UAV, then the vehicle position data may be received from the remote control system or a separate external device (e.g., computer). As discussed before, the position data may be represented as variables pitch_aircraft, roll_aircraft and yaw_aircraft.

The gimbal control data may be obtained 502. The gimbal control data may include a real or virtual attitude of the gimbal. The gimbal control data may optionally be generated at a gimbal control system. The gimbal control data may be generated at the gimbal in real-time or near real-time and then be transmitted to the remote control system, the flight control system, or any other system described herein, for further operations based on different embodiments. As discussed before, the gimbal control data may be represented as pitch_gimbal_real, roll_gimbal_real, and yaw_gimbal_real.

A gimbal mode may be obtained 503 through, for example, a user instruction. The gimbal mode selection may include a selection of a following gimbal mode. A mode selecting signal may be provided from a remote control system. A user may make a selection of the free gimbal mode at the remote control system. Alternatively, one or more processors may select the free gimbal mode from other modes. The mode selecting signal may indicate which mode the user would like the gimbal to enter into. This user selection may be made by a click on a display device, such as one shown in FIG. 1, or by a push made by the user on a mode selection button on the gimbal. The selected mode may be represented as "gimbal_mode."

Simulated gimbal response data may be generated 504. The simulated gimbal response data may be generated using a data fusion algorithm. The data fusion algorithm may be launched and the vehicle position data, the gimbal control data and the gimbal mode selection may be entered into the data fusion algorithm as inputs. The resulting simulated gimbal response data, as output of the data fusion algorithm, may include the simulated attitude data of the gimbal and may be represented as yaw_gimbal, roll_gimbal, and pitch_gimbal. An exemplary data fusion algorithm may be provided as follows:

1) "yaw_gimbal" may be "yaw_gimbal_real+Addment (yaw_aircraft, gimbal_mode, yaw_aircraft_modeClicked)," because the yaw_gimbal should be kept constant in the free gimbal mode, the function Addment( ) may be introduced. The value of the function "Addment" represents an angle between the aircraft and the yaw axis of the gimbal at the timing of enabling the free gimbal mode of the gimbal. By this angle addition, the difference of the yaw attitude of the gimbal and the yaw attitude of the UAV may be maintained unchanged in the free gimbal mode;

2) "roll_gimbal" may be "roll_gimbal_real+addment (roll_aircraft, gimbal_mode)." The function "addment( )" herein may represent a variable compensatory angle to compensate the roll direction of the gimbal when the gimbal is in the free gimbal mode. For example, if the roll_aircraft of the UAV is +10° relative to the roll axis when the free gimbal mode is enabled, then the value of the addment function is −10° relative to the roll axis. In this way, the roll attitude of the gimbal should be maintained unchanged in the free gimbal mode; and 3) "pitch_gimbal" may be "pitch_gimbal_real+addment (pitch_aircraft, gimbal_mode)." The function "addment( )" herein may represent a variable compensatory angle to compensate the pitch direction of the gimbal when the gimbal is in the free gimbal mode. For example, if the pitch_aircraft of the UAV is +10° relative to the pitch axis when the free gimbal mode is enabled, then the value of the addment function is −10° relative to the pitch axis. In this manner, the angle shift due to the entrance of the free gimbal mode could be compensated and therefore the gimbal could be maintained stable in the pitch direction.

Based on the above data fusion algorithm, the simulated gimbal response data may be obtained and transmitted to a remote control system 505. In some instances, the simulated gimbal response data may be transmitted to a remote controller of the remote control system, which in turn, may transmit the simulated gimbal response data to a display device for visual display. Alternatively, the simulated gimbal response data may be directly transmitted to a display device, or the display device and the remote controller may be the same device.

In some embodiments, if the data fusion algorithm herein is performed at the flight control system on-board the UAV, then the simulated gimbal response data may be transmitted from the UAV to the display device (optionally via the remote controller). In another embodiment, if the data fusion algorithm herein is performed at the remote control system, then the simulated gimbal response data may be directly transmitted from the remote controller to the display device (e.g., via a wired connection or a wireless connection). If the display device and the remote controller are integrated with each other, the simulated gimbal response data may be automatically displayed on the display of the remote controller. In other embodiments, the data fusion algorithm may be performed at a gimbal control system (e.g., on-board a gimbal or UAV), and the simulated gimbal response data may be transmitted to the remote control system. The data fusion algorithm may occur on any external device (e.g., server, cloud, other UAV), and may be transmitted to the remote control system.

The display device may comprise a screen that may depict the simulation data in a 2D or 3D rendering. The display device may be a mobile phone (e.g. smart phone), tablet, desktop computer, laptop computer, virtual reality headset, or a television or projector in communication with a computer device. In some cases, the display device may comprise a touch screen, an LCD screen, or a plasma screen.

Any of the modes described herein may be used to effect simulation of gimbal control for a user. In other instances, the various modes may be utilized during an active mode, such as when a user is actually flying a UAV and/or controlling a gimbal to collect image data using the image capture device. The user may select from different available modes to obtain different types of aerial photography.

Figure 6:
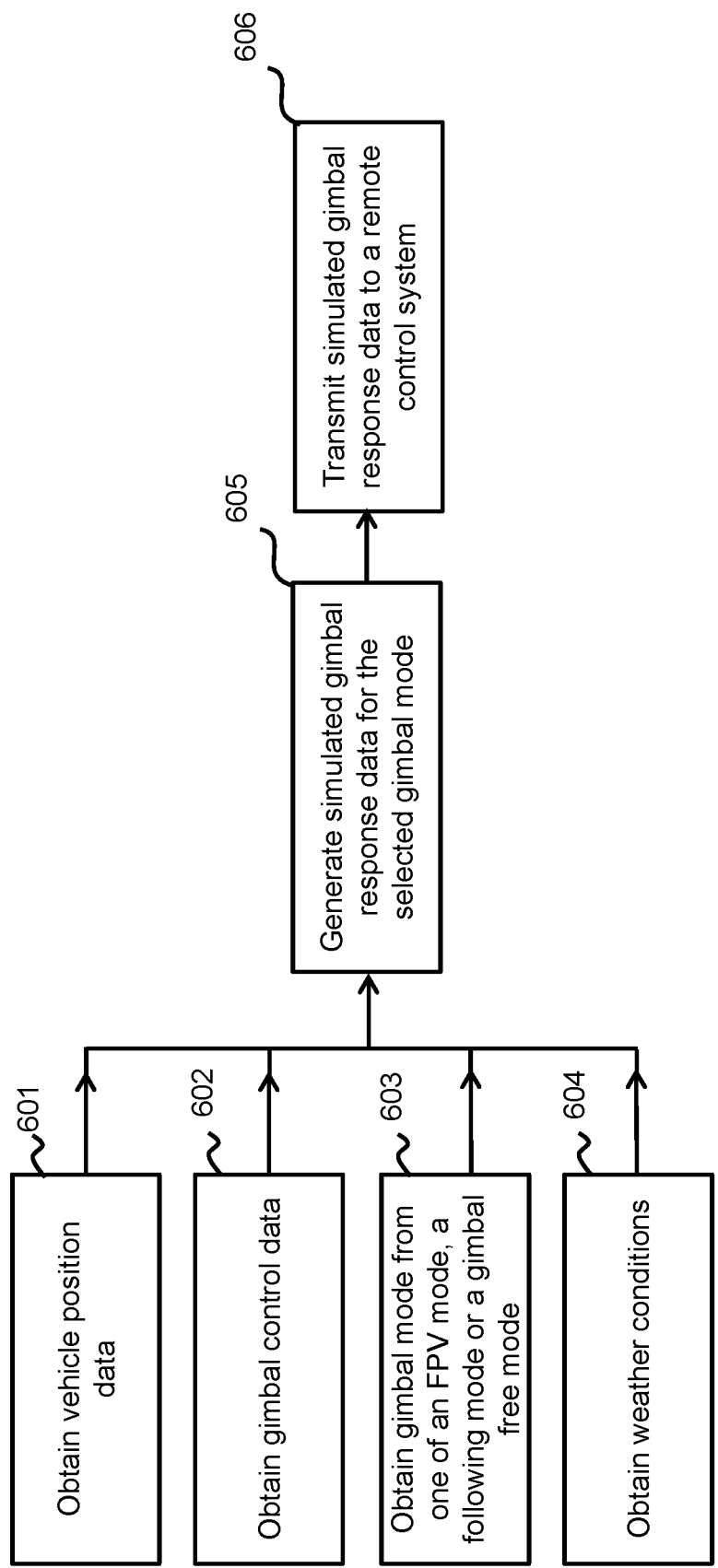
FIG. 6 illustrates an example of a simulation method when environment factors are taken into account in accordance with an embodiment of the disclosure.

FIG. 6 is a flow chart schematically illustrating a method of obtaining a simulated attitude of a gimbal when environment factors are taken into account in accordance with an embodiment of the disclosure.

In some embodiments, the vehicle position data describing an attitude of the vehicle from a vehicle control system on-board the vehicle is at least partially based on simulated weather data. In an example, the weather data is directed to data regarding one or more of a wind speed, a wind direction, precipitation (e.g., rain, snow, sleet, hail), humidity, air density, and/or temperature. In some embodiments, a user may select a weather condition through a user interface provided on the display device. A user may select a weather condition from a plurality of available weather conditions. Alternatively or in addition, the weather condition may be provided as an input to a physical model for applying a constant or variable force on the gimbal, for example a head or tail wind. For instance, the user may input a direction of wind and/or speed of wind. The weather conditions may optionally be selected or generated at random without requiring user input. The weather conditions may be generated based on previously collected real-life weather information. The weather conditions may be generated based on current weather conditions determined by one or more environmental sensors. Alternatively, the weather conditions may be entirely virtually generated without requiring any real-world data.

The physical model may output physical simulation data. The physical simulation data may be one or more physical parameters that may act on the gimbal. In an example, the physical model may output one or more forces acting on the gimbal. The simulated physical forces may have a simulated effect on the virtual gimbal. This may affect positioning of the virtual gimbal (e.g., orientation of the gimbal about a yaw, pitch, and/or roll axis, spatial location of the gimbal), which may affect the simulated gimbal response data.

As discussed before with respect to FIGS. 3-5, the gimbal may be in one of multiple modes, such as the FPV mode, the following mode and the free gimbal mode and therefore different data fusion algorithms are applied for these modes. However, these algorithms are not taken into environment factors into account. Thus, as an alternative or additional embodiment, FIG. 6 illustrates a general data fusion algorithm for obtaining the simulated gimbal response data when taking the environment factors into account.

The functions and operations 601, 602, and 603 are similar to those discussed with respect to 301, 302 and 303 in FIGS. 3, 401, 402, and 403 in FIG. 4, and 501, 502, and

503 in FIG. 5. The simulated weather information may be used in combination with any of the modes described herein.

The method of obtaining a simulated attitude of a gimbal when taking environment factors into account may include obtaining the vehicle position data 601. The gimbal control data may also be obtained 602. A gimbal mode may be obtained 603. The weather conditions may be obtained 604. Simulated gimbal response data for the FPV mode may be generated based on the vehicle position data, the gimbal control data, and the selected mode and weather conditions 605. The simulated gimbal response data may be transmitted to a remote control system 606.

The vehicle position data may be obtained 601. The vehicle position data may include the simulated attitude of the vehicle. As discussed before, the vehicle may be a UAV and the position data may be received from a flight control system on-board the UAV, or any other system. In some embodiments, if the method is performed at the UAV, then the vehicle position data may be received from the remote control system or a separate external device (e.g., computer). As discussed before, the vehicle position data may be represented as variables pitch_aircraft, roll_aircraft and yaw_aircraft.

The gimbal control data may be obtained 602. The gimbal control data may include a real or virtual attitude of the gimbal. The gimbal control data may optionally be generated at a gimbal control system. The gimbal control data may be generated at the gimbal in real-time or near real-time and then be transmitted to the control system, the flight control system, or any other system described herein, for further operations based on different embodiments. As discussed before, the gimbal control data may be represented as pitch_gimbal_real, roll_gimbal_real, and yaw_gimbal_real.

A gimbal mode may be obtained 603 through e.g., a user instruction. A user may make a selection of the gimbal mode at the remote control system. Alternatively, one or more processors may select the gimbal mode from other modes. A gimbal mode selecting signal may indicate which mode the user would like the gimbal to enter into. This user selection may be made by a click on a display device, such as one shown in FIG. 1, or by a push made by the user on a mode selection button on the gimbal. The selected mode may be represented as "gimbal_mode."

The environment factors or conditions may be obtained 604. For example, the environment factors may be a wind speed, a wind direction, precipitation (e.g., type of precipitation, amount of precipitation), humidity, air density, amount of sunshine, cloudiness, and/or temperature. In some instances, each of these factors may be determined individually and/or independently. In some instances, one or more of these factors may be bundled together to form one or more preselected weather modes. For instance, a user may select a "winter" weather mode, where there may be snow, moderate winds, low temperature, low sunshine. In another example, a user may select a "windy" mode with high wind speeds which may come from changing or unpredictable directions, and may have sunshine and no precipitation. In another example, a user may select "night flight" mode where the skies may be clear, the temperature low, and no sunshine. Thus, various flight condition options may be presented to a user that a user may select, where each flight condition option may have the factors preselected. These factors may be chosen randomly by a physical model or they may be input or selected by a user. In some cases, variable properties of the environment may be derived from a prior real flight performed by the UAV or other UAVs, or current real data from one or more sensors.

A user may select a weather condition through the user interface provided on the display device. The weather condition may be provided as an input to generate simulated gimbal response data 605. In an example, a weather condition may result in a constant or variable force on the gimbal. For example a head or tail wind may provide forces from different directions. The forces may be any one or combination of a drag force, lift force, gravitational force, normal force, tangential force, or any other force known to act on the gimbal. The wind speed may affect the amount of force that the gimbal may experience. For instance, higher wind speeds may exert a greater degree of force on the gimbal, and the simulated gimbal response data may reflect this. In another example, precipitation may also affect the gimbal. For instance, a downpour may provide a downward force on the gimbal. The response of the gimbal to instructions may be different under different weather conditions. For example, excessive heat or cold may affect how a gimbal may respond to a control signal. For instance, the gimbal may respond more slowly or not to as great a degree.

Then, according to the different gimbal mode, one or more of the yaw_gimbal_real, roll_gimbal_real, and pitch_gimbal_real may be compensated by taking the weather conditions into account 605.

For example, if the gimbal is in the free gimbal mode, then "roll_gimbal" may be "roll_gimbal_real+addment (roll_aircraft, gimbal_mode)+roll_gimbal_real_weather." The function "addment( )" herein may represent a variable compensatory angle to compensate the roll direction of the gimbal when the gimbal is in the following mode and the new entry roll_gimbal_real_weather denotes an angle difference in the roll axis caused by the current weather. For example, if the roll_aircraft of the UAV is +20° relative to the roll axis when the following mode is enabled and the weather is set to be a regular wind, then the value of the addment function is −20° relative to the roll axis. In this way, the roll attitude of the gimbal should be maintained as being consistent with the roll attitude of aircraft head in the following mode.

Further, "pitch_gimbal" may be "pitch_gimbal_real+addment (pitch_aircraft, gimbal_mode)+pitch_gimbal_ real_weather" in the free gimbal_mode. The function "addment( )" herein may represent a variable compensatory angle to compensate the pitch direction of the gimbal when the gimbal is in the following mode and the new entry pitch_gimbal_real_weather denotes an angle difference in the pitch axis caused by the current weather. For example, if the pitch_aircraft of the UAV is +20° relative to the pitch axis when the following mode is enabled and the current weather is set to be a baffling wind, then the value of the addment function is −20° relative to the pitch axis. In this manner, the angle shift due to the entrance of the following mode and the current weather could be compensated and therefore the gimbal could be maintained stable in the pitch direction.

Based on the above data fusion algorithm, the simulated gimbal response data taking the weather conditions into account may be obtained and transmitted to a remote control system 606. In some instances, the simulated gimbal response data may be transmitted to a remote controller of the remote control system, which in turn, may transmit the simulated gimbal response data to a display device for visual display. Alternatively, the simulated gimbal response data may be directly transmitted to a display device, or the display device and the remote controller may be the same device.

In some embodiments, if the data fusion algorithm herein is performed at the flight control system on-board the UAV, then the simulated gimbal response data may be transmitted from the UAV to the display device (optionally, via the remote controller). In another embodiment, if the data fusion algorithm herein is performed at the controller system, then the simulated gimbal response data may be directly transmitted from the remote controller to the display device (e.g., via a wired connection or a wireless connection). If the display device and the remote controller are integrated with each other, the simulated gimbal response data may be automatically displayed on the display of the remote controller. In other embodiments, the data fusion algorithm may be performed at a gimbal control system (e.g., on-board a gimbal or UAV), and the simulated gimbal response data may be transmitted to the remote control system. The data fusion algorithm may occur on any external device (e.g., server, cloud, other UAV), and may be transmitted to the remote control system.

The display device may comprise a screen that may depict the simulation data in a 2D or 3D rendering. The display device may be a mobile phone (e.g. smart phone), tablet, desktop computer, laptop computer, virtual reality headset, or a television or projector in communication with a computer device. In some cases, the display device may comprise a touch screen, an LCD screen, or a plasma screen.

It is to be understood that the mode selection and the weather condition selection in accordance with some embodiments of the disclosure as discussed before with respect to FIGS. 3-6 are only for illustrative purposes. A person skilled in the art may understand, based on the teaching of the specification, that the simulation methods, systems and devices of the disclosure may be practiced without the mode selection and the weather condition selection. For example, the simulation method as proposed may be implemented merely based on a single mode, such as one of the FPV mode, the following mode and the free gimbal mode, which may be preset or selected by the user. Therefore, the user may be trained under a specific mode, which may make the training more targeted. Likewise, the weather condition selection may be ignored or omitted if the real flying environment is ideal and peaceful. Further, the data fusion directed to different gimbal modes herein is merely illustrative of some examples of the simulation algorithms and the simulation methods of the disclosure may be applied without regard to the gimbal mode.

Figure 7:
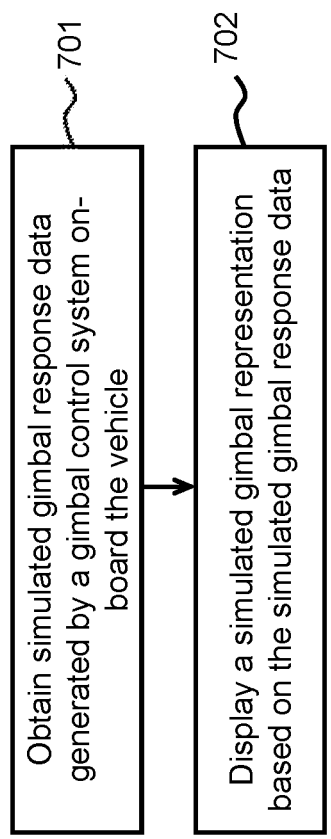
FIG. 7 illustrates an example of a simulation method in accordance with an embodiment of the disclosure.

FIG. 7 is a flow chart schematically illustrating a method of simulating gimbal control in accordance with an embodiment of the disclosure.

Simulated gimbal response data generated by a gimbal control system on-board the vehicle may be received 701 at a remote control system remote to a vehicle, wherein the simulated gimbal response data is generated based on (1) gimbal control data from the remote control system configured to communicate with the gimbal control system and (2) position data describing an attitude of the vehicle generated from a vehicle control system on-board the vehicle. A simulated gimbal representation may be displayed at the remote control system based on the simulated gimbal response data on a display device 702.

In some embodiments, the vehicle is an unmanned aerial vehicle ("UAV") and the simulated gimbal response data is determined according to a gimbal mode, wherein the gimbal mode includes one of a first person view mode, a following mode, or a free gimbal mode as discussed in detail before with respect to FIGS. 3-5.

When the gimbal is operated in the first person view mode, the simulated gimbal response data stabilizes a pitch axis of the gimbal with respect to the environment without stabilizing a yaw axis and a roll axis. In other words, the pitch attitude of the gimbal would be compensated by the data fusion taking into account the environment, such as the weather data, as discussed with respect to FIG. 6.

When the gimbal is operated in the following mode, the simulated gimbal response data stabilizes a pitch axis and a roll axis of the gimbal with respect to the environment without stabilizing a yaw axis. In other words, the pitch and roll attitudes of the gimbal would be compensated by the data fusion taking into account the environment, such as the weather data, as discussed with respect to FIG. 6.

When the gimbal is operated in the free gimbal mode, the simulated gimbal response data stabilizes a pitch axis, a yaw axis, and a roll axis of the gimbal with respect to the environment. In other words, the pitch and roll attitudes of the gimbal would be compensated by the data fusion taking into account the environment, such as the weather data, as discussed with respect to FIG. 6.

The gimbal response data may be determined based on a gimbal mode signal generated at the remote control system remote to the vehicle. The gimbal mode signal may be generated in response to a user input indicating a selection of a gimbal mode from the plurality of gimbal modes, such as the first person view mode, the following mode and the free gimbal mode. A user may select a gimbal mode from a plurality of gimbal modes. The simulation may reflect the selected gimbal mode. Virtual visual data captured by the virtual camera may reflect the selected gimbal mode. A user may alter a gimbal mode via a user input. The alteration to the gimbal mode may occur prior to the simulated flight and/or during the simulated flight. The simulation may reflect the update to the gimbal mode. The virtual visual data captured by the virtual camera may be updated to reflect the updated gimbal mode.

A remote controller may be configured to transmit the simulated gimbal response data to a display device comprising a visual display. Alternatively, the display device may directly obtain the simulated gimbal response data. The visual display may show simulated gimbal state information of the UAV. The simulated gimbal state information may include simulated visual data captured by a camera fitted in the gimbal. The display device may be a mobile device and the remote control system may communicate with the display device via a wireless connection. In some embodiments, the remote control system may comprise the display device. In some instances, a remote controller that may accept a user input to control the gimbal and/or UAV may have a display device incorporated therein. In an example, the remote control system may be the same remote control system used to operate the vehicle and the gimbal in a real flight operation.

The remote control system may further comprise a display device that receives the simulated gimbal response data and displays a visual illustration of the gimbal in an orientation described by the gimbal response data. The remote control system may include one or more joystick controls useful for controlling directional heading of the gimbal.

The position data describing an attitude of the vehicle from a vehicle control system on-board the vehicle may be at least partially based on simulated orientation of the vehicle. In some embodiments, the position data describing an attitude of the vehicle from a vehicle control system on-board the vehicle is at least partially based on simulated weather data.

In some embodiments, the position data describing an attitude of the vehicle from a vehicle control system on-board the vehicle is at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis.

Figure 8:
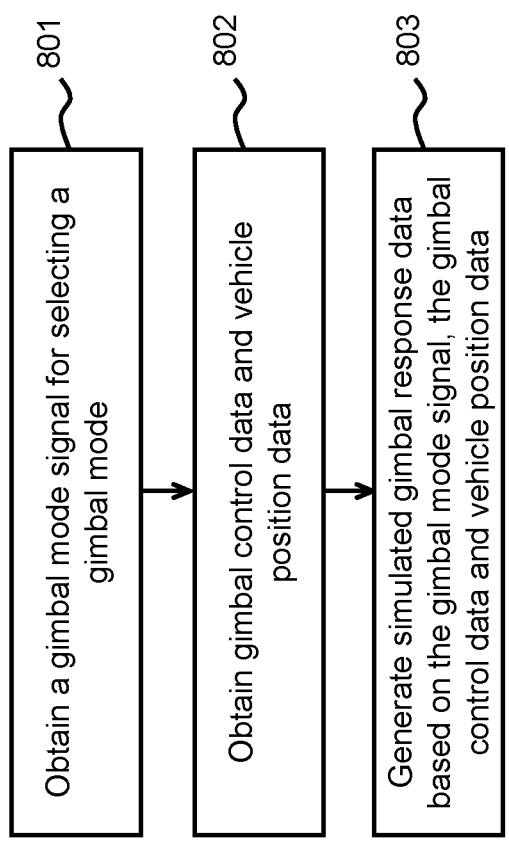
FIG. 8 illustrates an example of a simulation method in accordance with an embodiment of the disclosure.

FIG. 8 is a flow chart schematically illustrating a method of simulating gimbal control in accordance with an embodiment of the disclosure.

As illustrated in FIG. 8, a gimbal mode signal indicative of a selection from a plurality of gimbal modes is obtained 801. Then, gimbal control data from a remote control system and vehicle position data describing a simulated attitude of the vehicle generated from a vehicle control system on-board the vehicle are obtained 802. Simulated gimbal response data is generated 803 based on the gimbal control data, the vehicle position data describing the simulated attitude of the vehicle, and the gimbal mode signal, wherein the simulated gimbal response data causes a different set of axes to be stabilized with respect to an environment of the vehicle under each of the plurality of gimbal modes.

As discussed before with respect to FIGS. 2-6, the gimbal mode according to the embodiments of the disclosure may include a first person view mode, a following mode and/or a free gimbal mode. In each mode, the gimbal may be stabilized about various axes to allow the gimbal to remain stable. This may permit the image capture device to keep horizontal.

In some embodiments, the simulated gimbal response data may include simulated gimbal state information which represents an attitude of the gimbal relative to the vehicle. A visual display may be used to show simulated gimbal state information of the vehicle. Further, the simulated gimbal state information may include simulated visual data captured by a camera fitted in the gimbal.

The vehicle position data describing an attitude of the vehicle from a vehicle control system on-board the vehicle may be at least partially based on simulated orientation of the vehicle. In some embodiments, the position data describing an attitude of the vehicle from a vehicle control system on-board the vehicle is at least partially based on simulated weather data. The vehicle position data describing an attitude of the vehicle from a vehicle control system on-board the vehicle may be at least partially based on the vehicle position data describing the simulated attitude of the vehicle which includes at least one of (1) rotation of the vehicle about a pitch axis, (2) rotation of the vehicle about a yaw axis, or (3) rotation of the vehicle about a roll axis.

As discussed before, based on the gimbal control data, the vehicle position data, and the gimbal mode signal, and optional weather data, a data fusion algorithm may be performed at a gimbal control system (e.g., on-board a gimbal or UAV. The data fusion algorithm may occur on any external device (e.g., server, cloud, other UAV), and may be transmitted to the remote control system. In some embodiments, the method may further comprise transmitting the simulated gimbal response data to a remote controller of the remote control system, which in turn may transmit the simulated gimbal response data to a display device that displays a visual illustration of the gimbal in an orientation described by the gimbal response data. Alternatively, the simulated gimbal response data may be directly transmitted to a display device, or the display device and the remote controller may be the same device. The simulated gimbal response data may be generated by one or more me processors.

Figure 9:
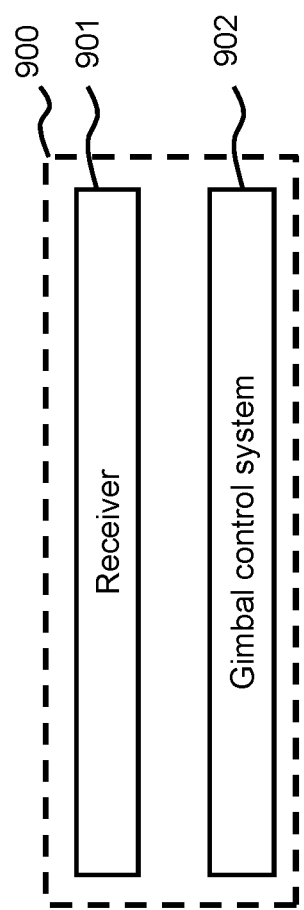
FIG. 9 is a schematic diagram of a gimbal on-board a vehicle in accordance with an embodiment of the disclosure.

FIG. 9 is a schematic diagram of a gimbal on-board a vehicle in accordance with an embodiment of the disclosure.

As illustrated in FIG. 9, the gimbal 900 on-board the vehicle may include a receiver 901 configured to receive a gimbal mode signal indicative of a selection from a plurality of gimbal modes. The gimbal 900 on-board the vehicle may further comprise a gimbal control system 902 configured to (1) receive gimbal control data from a remote control system, (2) receive position data describing a simulated attitude of the vehicle generated from a flight control system on-board the vehicle and (3) simulated gimbal response data based on (1) the gimbal control data, (2) the position data describing the simulated attitude of the vehicle, and (3) the gimbal mode signal, wherein the simulated gimbal response data causes a different set of axes to be stabilized with respect to an environment of the vehicle under each of the plurality of gimbal modes.

The gimbal may optionally comprise one or more gimbal components that may be movable relative to one another. The gimbal components may move relative to one another with aid of an actuator. Each gimbal component may optionally have a corresponding actuator that may permit the movement of the gimbal component. In some instances, one or more gimbal components may permit rotation of the payload about a pitch axis, one or more gimbal components may permit rotation of the payload about a yaw axis, and one or more gimbal components may permit rotation of the payload about a roll axis. In some instances, depending on a selected mode, the gimbal components may be individually controlled to provide a desired stabilization effect. For instance, a first gimbal component may be stabilized while a second and a third gimbal component are not stabilized. In another instance, a first and second gimbal components may be stabilized, while the third gimbal component is not stabilized. In another example, the first, second, and third gimbal components may all be stabilized. The payload may be supported by one or more of the gimbal components. The payload may directly contact a single gimbal component. Alternatively, the payload may directly contact multiple gimbal components.

When the gimbal mode signal is indicative of a selection of the first person view mode, the simulated gimbal response data may stabilize a pitch axis of the gimbal with respect to the environment without stabilizing a yaw axis and a roll axis. In other words, the pitch attitude of the gimbal would be compensated by the data fusion taking into account the environment, such as the weather data, as discussed with respect to FIG. 6.

When the gimbal mode signal is indicative of a selection of the following mode, the simulated gimbal response data may stabilize a pitch axis and a roll axis of the gimbal with respect to the environment without stabilizing a yaw axis. In other words, the pitch and roll attitudes of the gimbal would be compensated by the data fusion taking into account the environment, such as the weather data, as discussed with respect to FIG. 6.

When the gimbal mode signal is indicative of a selection of the free gimbal mode, the simulated gimbal response data stabilizes a pitch axis, a yaw axis, and a roll axis of the gimbal with respect to the environment. In other words, the pitch and roll attitudes of the gimbal would be compensated by the data fusion taking into account the environment, such as the weather data, as discussed with respect to FIG. 6.

In some embodiments, the gimbal mode signal may be generated at the remote control system remote to the vehicle. In some embodiments, the gimbal mode signal may be generated in response to a user input indicating a selection of a gimbal mode from the plurality of gimbal modes In some embodiments, (1) gimbal control data from a remote control system configured to communicate with the gimbal control system and (2) position data describing a simulated attitude of the vehicle are received at a gimbal control system on-board a vehicle. The vehicle may be an unmanned aerial vehicle ("UAV"). The simulated gimbal state information may include simulated visual data captured by a camera fitted in the gimbal.

The simulated attitude of the vehicle may be generated by a vehicle control system on-board the vehicle and a remote control system is configured to receive the simulated gimbal response data and transmit the simulated gimbal response data to a display device comprising a visual display showing simulated gimbal state information of the UAV. The remote control system may be the same remote control system used to operate the vehicle and the gimbal in a real flight operation and may include one or more joystick controls useful for controlling directional heading of the gimbal.

In some embodiments, the display device may be a mobile device and the remote control system may communicate with the display device via a wireless connection. In some embodiments, the remote control system may comprise the display device that receives the simulated gimbal response data and displays a visual illustration of the gimbal in an orientation described by the gimbal response data.

Figure 10:
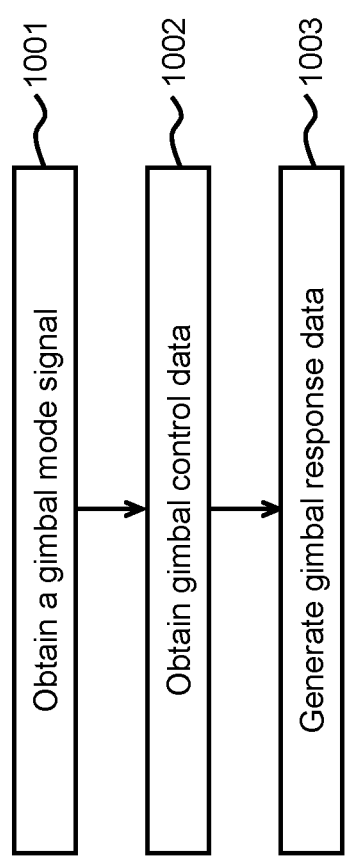
FIG. 10 illustrates an example of a method for operating a gimbal in accordance with an embodiment of the disclosure.

FIG. 10 is a flow chart schematically illustrating a method of operating a gimbal on-board a vehicle in accordance with an embodiment of the disclosure.

As illustrated in FIG. 10, a gimbal mode signal indicative of whether the gimbal is to be in an active mode or a simulation mode is obtained 1001. Gimbal control data from a remote control system is obtained 1002. Gimbal response data is generated 1003 at the gimbal control system based on the gimbal control data from the remote control system, wherein the gimbal response data is (1) communicated to one or more actuators configured to adjust an arrangement of the gimbal when the gimbal is in the active mode and is (2) not communicated to one or more actuators when the gimbal is in the simulation mode.

The simulated gimbal response data may include simulated gimbal state data which represents an attitude of the gimbal relative to the vehicle. A visual display may show simulated gimbal state information of the vehicle. The simulated gimbal state information may include simulated visual data captured by a camera fitted in the gimbal.

In some embodiments, the method may further comprise transmitting the simulated gimbal response data to a display device that displays a visual illustration of the gimbal in an orientation described by the gimbal response data. The simulated gimbal response data may be generated by one or more processors.

The position data describing an attitude of the vehicle from a vehicle control system on-board the vehicle may be at least partially based on simulated orientation of the vehicle. Further, the position data describing an attitude of the vehicle from the vehicle control system on-board the vehicle may be at least partially based on simulated weather data. The position data describing an attitude of the vehicle from the vehicle control system on-board the vehicle may at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis.

In some embodiments, the one or more actuators include one or more motors. The one or more actuators may permit rotation of one or more frame components of the gimbal about an axis. The one or more actuators may permit translation of the gimbal. In some embodiments, the gimbal mode signal may be generated at the remote control system remote to the vehicle or may be generated in response to a user input indicating a selection between the active mode and the simulation mode.

Figure 11:
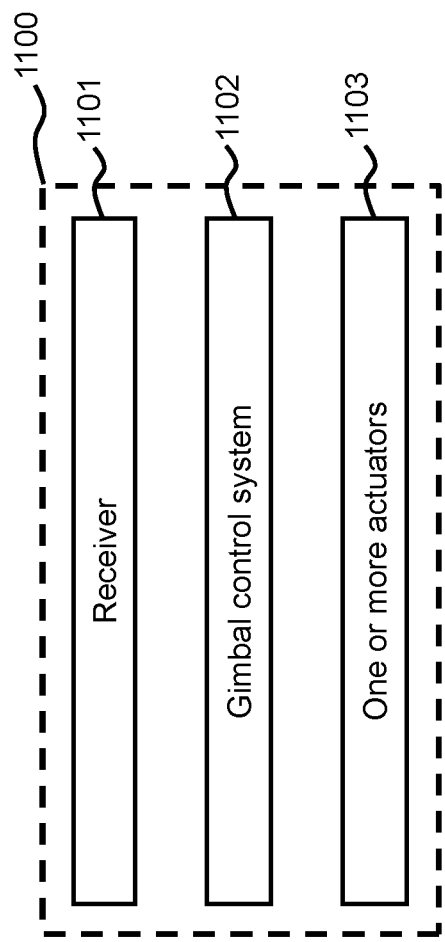
FIG. 11 is a schematic diagram of a gimbal in accordance with an embodiment of the disclosure.

FIG. 11 is a schematic diagram of a gimbal on-board a vehicle in accordance with an embodiment of the disclosure.

As illustrated in FIG. 11, the gimbal 1100 on-board the vehicle may include a receiver 1101, configured to receive a gimbal mode signal indicative of whether the gimbal is to be in an active mode or a simulation mode. The gimbal 1100 on-board the vehicle may further include a gimbal control system 1102 configured to (1) receive gimbal control data from a remote control system, and (2) gimbal response data based on the gimbal control data from the remote control system. The gimbal 1100 on-board the vehicle may additionally include one or more actuators 1103 configured to (1) adjust an arrangement of the gimbal when the gimbal is in the active mode, or (2) remain dormant and not adjust the arrangement of the gimbal when the gimbal is in the simulation mode.

The gimbal control data from a remote control system configured to communicate with the gimbal control system and (2) position data describing a simulated attitude of the vehicle are received at a gimbal control system on-board the vehicle are received at a control system on-board the vehicle. The remote control system may be configured to receive the simulated gimbal response data and transmit the simulated gimbal response data to a display device comprising a visual display showing simulated gimbal state information of the vehicle. The remote control system may include one or more joystick controls useful for controlling directional heading of the gimbal. The display device may be a mobile device and the remote control system may communicate with the display device via a wireless connection.

The remote control system may comprise a display device that receives the simulated gimbal response data and displays a visual illustration of the gimbal in an orientation described by the gimbal response data. The remote control system may be the same remote control system used to operate the vehicle and the gimbal in a real flight operation. In some embodiments, the simulated gimbal state information includes simulated visual data captured by a camera fitted in the gimbal.

In some instances, the position data describing an attitude of the vehicle from a vehicle control system on-board the vehicle may be at least partially based on simulated orientation of the vehicle. Further, the position data describing an attitude of the vehicle from a vehicle control system on-board the vehicle may be at least partially based on simulated weather data.

The position data describing an attitude of the vehicle from a vehicle control system on-board the vehicle may be at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis.

In some embodiments, the one or more actuators include one or more motors. The one or more actuators may permit rotation of one or more frame components of the gimbal about an axis. The one or more actuators may permit translation of the gimbal. In some embodiments, the gimbal mode signal may be generated at the remote control system remote to the vehicle. The gimbal mode signal may be generated in response to a user input indicating a selection between the active mode and the simulation mode. The vehicle herein may be an unmanned aerial vehicle ("UAV").

Figure 12:
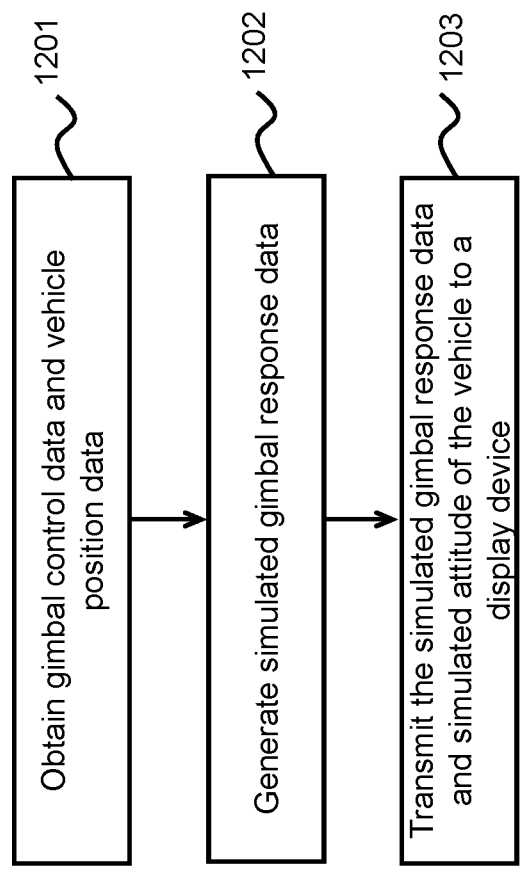
FIG. 12 illustrates an example of a simulation method in accordance with an embodiment of the disclosure.

FIG. 12 is a flow chart schematically illustrating a method of simulating gimbal control in accordance with an embodiment of the disclosure.

As illustrated in FIG. 12, (1) gimbal control data from a remote control system configured to communicate with the gimbal control system and (2) vehicle position data describing a simulated attitude of the vehicle are obtained 1201. Simulated gimbal response data is generated 1202 at a gimbal control system based on the gimbal control data and the position data describing the simulated attitude of the vehicle. Then, the simulated gimbal response data and the simulated attitude of the vehicle are transmitted to a remote control system 1203, which may in turn, transmit the simulated attitude of the vehicle to a display device, wherein the display device may generate a visual depiction based on the simulated gimbal response data and the simulated attitude of the vehicle. The vehicle here may be an unmanned aerial vehicle ("UAV").

In some instances, the simulated gimbal response data may include simulated gimbal state data which represents an attitude of the gimbal relative to the vehicle. A visual display may show simulated gimbal state information of the vehicle. The simulated gimbal state information includes simulated visual data captured by a camera fitted in the gimbal. The remote control system may include one or more joystick controls useful for controlling directional heading of the gimbal. The simulated gimbal response data may be generated by one or more processors.

In some embodiments, the position data describing an attitude of the vehicle from a vehicle control system on-board the vehicle may be at least partially based on simulated orientation of the vehicle. In some embodiments, the position data describing an attitude of the vehicle from a vehicle control system on-board the vehicle may be at least partially based on simulated weather data descriptive of multiple weather conditions. The position data describing an attitude of the vehicle from a vehicle control system on-board the vehicle may be at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis.

Figure 13:
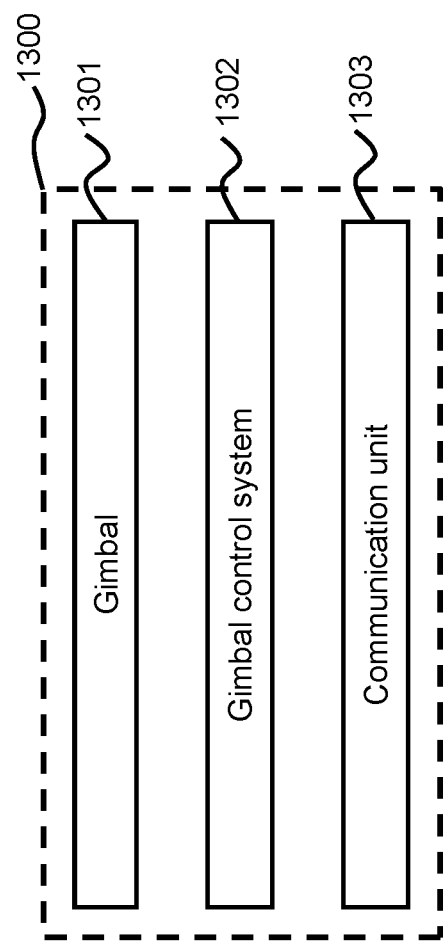
FIG. 13 is a schematic diagram of a gimbal simulation system in accordance with an embodiment of the disclosure.

FIG. 13 is a schematic diagram of a gimbal simulation system in accordance with an embodiment of the disclosure.

As illustrated in FIG. 13, the gimbal simulation system 1300 may include a gimbal 1301 on-board a vehicle. The gimbal simulation system 1300 may further comprise a gimbal control system 1302 on-board the vehicle configured to (1) receive gimbal control data from a remote control system, (2) receive position data describing a simulated attitude of the vehicle generated from a vehicle control system on-board the vehicle; and (3) generate simulated gimbal response data based on (i) the gimbal control data and (ii) the position data describing the simulated attitude of the vehicle. The gimbal simulation system 1300 may additionally include a communication unit 1303 configured to transmit, to a display device, the simulated gimbal response data and the simulated attitude of the vehicle, wherein the display device generates a visual depiction based on the simulated gimbal response data and the simulated attitude of the vehicle.

The display device is a handheld device. The display device may be integrated with a remote control system in communication with the gimbal control system. In some embodiments, the simulated gimbal response data is calculated by determining a simulated attitude of the gimbal relative to the simulated attitude of the vehicle.

In some embodiments, (1) the gimbal control data from a remote control system configured to communicate with the gimbal control system and (2) the position data describing a simulated attitude of the vehicle are received at a gimbal control system on-board a vehicle. The vehicle may be an unmanned aerial vehicle ("UAV"). The simulated attitude of the vehicle may be generated by a vehicle control system on-board the vehicle.

In some embodiments, the simulated gimbal response data may be determined according to a gimbal mode from multiple gimbal modes, wherein the gimbal mode may include one of a first person view mode, a following mode, and a free gimbal mode. When the gimbal is operated in the first person view mode, the simulated gimbal response data may stabilize a pitch axis of the gimbal with respect to the environment without stabilizing a yaw axis and a roll axis. When the gimbal is operated in the following mode, the simulated gimbal response data may stabilize a pitch axis and a roll axis of the gimbal with respect to the environment without stabilizing a yaw axis. When the gimbal is operated in the free gimbal mode, the simulated gimbal response data may stabilize a pitch axis, a yaw axis, and a roll axis of the gimbal with respect to the environment. The environment herein may be in respect to multiple weather conditions.

In some instances, the position data describing an attitude of the vehicle from a vehicle control system on-board the vehicle may be at least partially based on simulated orientation of the vehicle. In some embodiments, the position data describing an attitude of the vehicle from a vehicle control system on-board the vehicle may be at least partially based on simulated weather data. The position data describing an attitude of the vehicle from a vehicle control system on-board the vehicle may be at least partially based on the position data describing the simulated attitude of the vehicle which includes at least one of (1) rotation of the vehicle about a pitch axis, (2) rotation of the vehicle about a yaw axis, or (3) rotation of the vehicle about a roll axis.

A simulation may provide a user with a virtual experience of controlling a gimbal while a UAV is in simulated flight. The user may practice controlling the gimbal alone, or may practice controlling the gimbal and the UAV. In some instances, different users may practice controlling each part (e.g., a first user may control a gimbal while a second user may control a UAV).

The simulation may show the user the perspective of an image capture device supported by the gimbal. The user may view virtual visual data captured by the image capture device in real-time. Depending on a selected gimbal mode, the virtual image capture device may be stabilized about different rotational axes which may provide a different visual effect by the image capture device.

The simulation may also show the gimbal operating in the virtual environment. The simulation may show the gimbal supported by the UAV within the virtual environment. The location of the gimbal and/or UAV in the virtual environment may be displayed. The positioning of the gimbal may be displayed. For instance, the degree of rotation by one or more gimbal components may be displayed. The orientation of the payload within the virtual environment may be displayed. In some instances, virtual measurements may be displayed. For instance, degree of orientation of the UAV about one or more axes may be displayed as numerical values. Similarly, a spatial location of the UAV in the virtual environment may be displayed as spatial coordinates. In a similar manner, the degree of orientation of the payload supported by the gimbal about one or more axes may be displayed as numerical values. The spatial location of the payload in the virtual environment may be displayed as spatial coordinates. Measurements for degree of rotation for each gimbal component may or may not be displayed as numerical values.

The virtual environment may be displayed. The virtual environment may include one or more geographic features. This may include naturally occurring features such as mountains, hills, lakes, rivers, creeks, valleys, forests, boulders, terrain, shores, or any other naturally occurring feature. This may also include virtual manmade features such as buildings, vehicles, bridges, airports, landing strips, or any other man-made feature. Moving objects such as humans or animals may be displayed. The virtual image from the image capturing device may correspond to the estimated position and orientation of the image capture device within the virtual environment.

Figure 14:
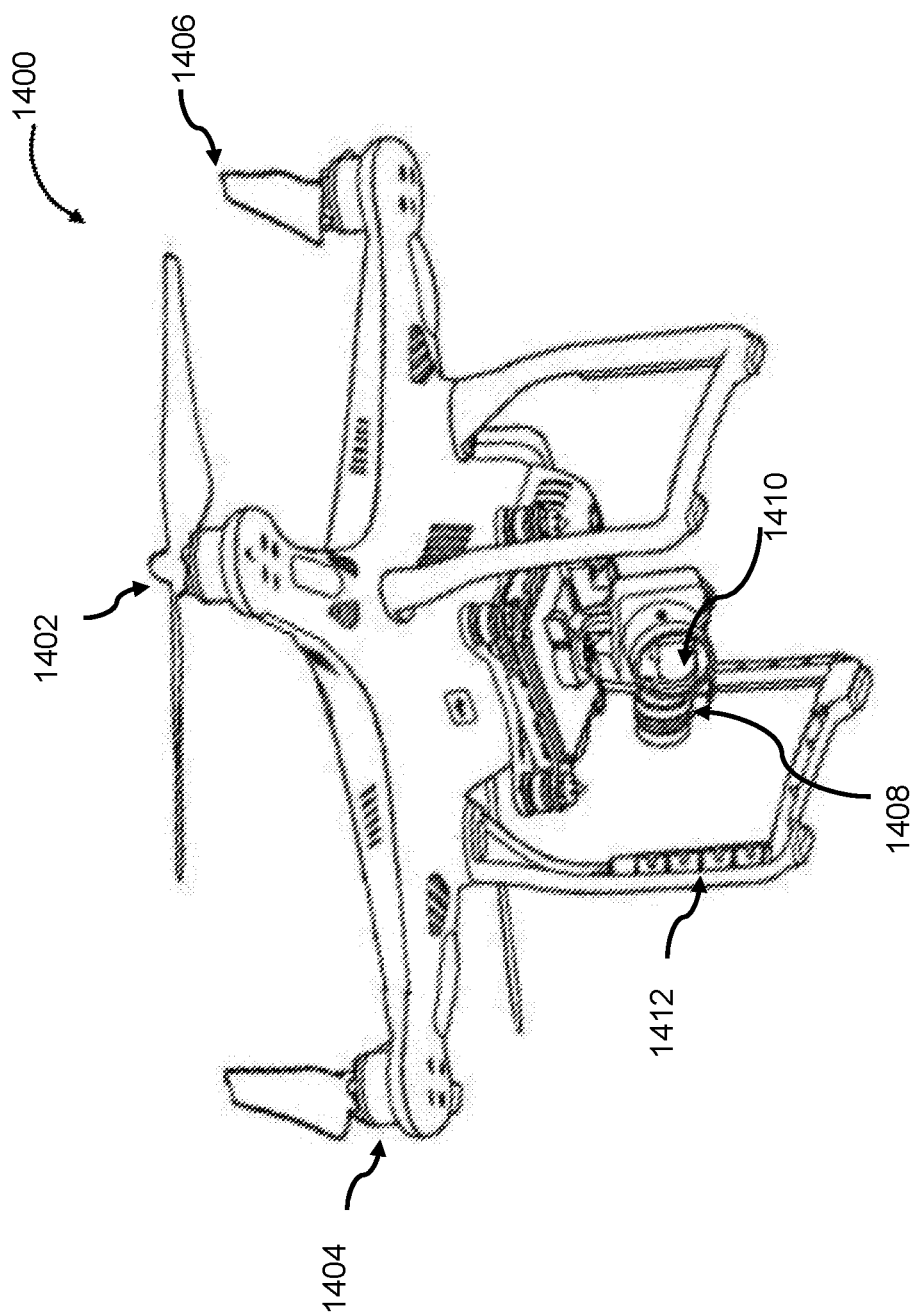
FIG. 14 schematically illustrates a UAV with a gimbal in accordance with an embodiment of the disclosure.

FIG. 14 schematically illustrates an unmanned aerial vehicle 1400 with a gimbal in accordance with an embodiment of the disclosure.

The UAV may be an example of a movable object as described herein. The UAV 1400 may include a propulsion system having four rotors, such as those 1402, 1404, and 1406 as explicitly depicted. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/ or change location. The distance between shafts of opposite rotors may be any suitable length. For example, the length may be less than or equal to 2 m, or less than equal to 5 m. In some embodiments, the length may be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object may be configured to carry a load, such as the gimbal 1408, which may support an image capture device 1410 as depicted. The load may include one or more of passengers, cargo, equipment, instruments, and the like. The load may be provided within a housing. The housing may be separate from a housing of the movable object, or be part of a housing for a movable object. Alternatively, the load may be provided with a housing while the movable object does not have a housing. Alternatively, portions of the load or the entire load may be provided without a housing. The load may be rigidly fixed relative to the movable object. Optionally, the load may be movable relative to the movable object (e.g., translatable or rotatable relative to the movable object). The load may include a payload and/or a carrier, as described elsewhere herein.

In some embodiments, the movement of the movable object, carrier, and payload relative to a fixed reference frame (e.g., the surrounding environment) and/or to each other, may be controlled by a terminal. The terminal may be a remote controller device, such as the remote controller 101 shown in FIG. 1, at a location distant from the movable object, carrier, and/or payload. The terminal may be disposed on or affixed to a support platform. Alternatively, the terminal may be a handheld or wearable device. For example, the terminal may include a smart phone, tablet, laptop, computer, glasses, gloves, helmet, microphone, or suitable combinations thereof. The terminal may include a user interface, such as a keyboard, mouse, joystick, touch screen, or display. Any suitable user input may be used to interact with the terminal, such as manually entered commands, voice control, gesture control, or position control (e.g., via a movement, location or tilt of the terminal).

The terminal may be used to control any suitable state of the movable object, carrier, and/or payload. For example, the terminal may be used to control the position and/or orientation of the movable object, carrier, and/or payload relative to a fixed reference from and/or to each other. In some embodiments, the terminal may be used to control individual elements of the movable object, carrier, and/or payload, such as the actuation assembly of the carrier, a sensor of the payload, or an emitter of the payload. The terminal may include a wireless communication device adapted to communicate with one or more of the movable object, carrier, or payload. The terminal may correspond to a remote controller as described elsewhere herein. The terminal may optionally be a display device or may include a display device. The terminal may be part of the remote control system.

The terminal may include a suitable display unit for viewing information of the movable object, carrier, and/or payload. For example, the terminal may be configured to display information of the movable object, carrier, and/or payload with respect to position, translational velocity, translational acceleration, orientation, angular velocity, angular acceleration, or any suitable combinations thereof. In some embodiments, the terminal may display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 15:
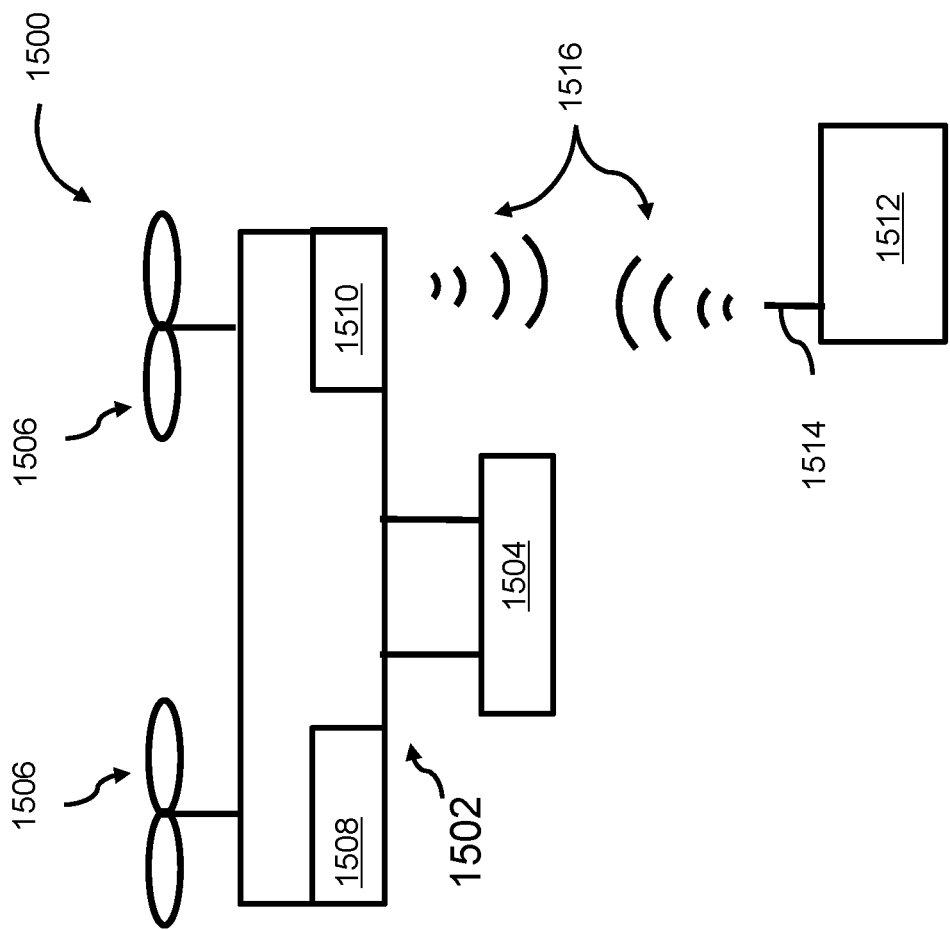
FIG. 15 illustrates a movable object including a carrier and a payload, in accordance with an embodiment of the disclosure.

FIG. 15 illustrates a movable object 1500 including a carrier 1502 and a payload 1504, in accordance with embodiments of the disclosure. Although the movable object 1500 is depicted as an aircraft, this depiction is not intended to be limiting, and any suitable type of movable object may be used, as previously described herein. One of skill in the art would appreciate that any of the embodiments described herein in the context of aircraft systems may be applied to any suitable movable object (e.g., a UAV). In some instances, the payload 1504 may be provided on the movable object 1500 without requiring the carrier 1502. The movable object 1500 may include propulsion mechanisms 1506, a sensing system 1508, and a communication system 1510.

The propulsion mechanisms 1506 may include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms may be different types of propulsion mechanisms. The propulsion mechanisms 1506 may be mounted on the movable object 1500 using any suitable means, such as a support element (e.g., a drive shaft) as described elsewhere herein. The propulsion mechanisms 1506 may be mounted on any suitable portion of the movable object 1500, such on the top, bottom, front, back, sides, or suitable combinations thereof.

In some embodiments, the propulsion mechanisms 1506 may enable the movable object 1500 to take off vertically from a surface or land vertically on a surface without requiring any horizontal movement of the movable object 1500 (e.g., without traveling down a runway). Optionally, the propulsion mechanisms 1506 may be operable to permit the movable object 1500 to hover in the air at a specified position and/or orientation. One or more of the propulsion mechanisms 1506 may be controlled independently of the other propulsion mechanisms. Alternatively, the propulsion mechanisms 1506 may be configured to be controlled simultaneously. For example, the movable object 1500 may have multiple horizontally oriented rotors that may provide lift and/or thrust to the movable object. The multiple horizontally oriented rotors may be actuated to provide vertical takeoff, vertical landing, and hovering capabilities to the movable object 1500. In some embodiments, one or more of the horizontally oriented rotors may spin in a clockwise direction, while one or more of the horizontally oriented rotors may spin in a counterclockwise direction. For example, the number of clockwise rotors may be equal to the number of counterclockwise rotors. The rotation rate of each of the horizontally oriented rotors may be varied independently in order to control the lift and/or thrust produced by each rotor, and thereby adjust the spatial disposition, velocity, and/or acceleration of the movable object 1500 (e.g., with respect to up to three degrees of translation and up to three degrees of rotation).

The sensing system 1508 may include one or more sensors that may sense the spatial disposition, velocity, and/or acceleration of the movable object 1500 (e.g., with respect to up to three degrees of translation and up to three degrees of rotation). The one or more sensors may include global positioning system ("GPS") sensors, motion sensors, inertial sensors, proximity sensors, or image sensors. The sensing data provided by the sensing system 1508 may be used to control the spatial disposition, velocity, and/or orientation of the movable object 1500 (e.g., using a suitable processing unit and/or control module, as described below). Alternatively, the sensing system 1508 may be used to provide data regarding the environment surrounding the movable object, such as weather conditions, proximity to potential obstacles, location of geographical features, location of manmade structures, and the like.

The communication system 1510 enables communication with terminal 1512 having a communication system 1514 via wireless signals 1516. The communication systems 1510, 1514 may include any number of transmitters, receivers, and/or transceivers suitable for wireless communication. The communication may be one-way communication, such that data may be transmitted in only one direction. For example, one-way communication may involve only the movable object 1500 transmitting data to the terminal 1512, or vice-versa. The data may be transmitted from one or more transmitters of the communication system 1510 to one or more receivers of the communication system 1512, or vice-versa. Alternatively, the communication may be two-way communication, such that data may be transmitted in both directions between the movable object 1500 and the terminal 1512. The two-way communication may involve transmitting data from one or more transmitters of the communication system 1510 to one or more receivers of the communication system 1514, and vice-versa.

In some embodiments, the terminal 1512 may provide control data to one or more of the movable object 1500, carrier 1502, and payload 1504 and receive information from one or more of the movable object 1500, carrier 1502, and payload 1504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1506), or a movement of the payload with respect to the movable object (e.g., via control of the carrier 1502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 1508 or of the payload 1504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided and transmitted by the terminal 1512 may be configured to control a state of one or more of the movable object 1500, carrier 1502, or payload 1504. Alternatively or in combination, the carrier 1502 and payload 1504 may also each include a communication module configured to communicate with terminal 1512, such that the terminal may communicate with and control each of the movable object 1500, carrier 1502, and payload 1504 independently.

In some embodiments, the movable object 1500 may be configured to communicate with another remote device in addition to the terminal 1512, or instead of the terminal 1512. The terminal 1512 may also be configured to communicate with another remote device as well as the movable object 1500. For example, the movable object 1500 and/or terminal 1512 may communicate with another movable object, or a carrier or payload of another movable object. When desired, the remote device may be a second terminal or other computing device (e.g., computer, laptop, tablet, smartphone, or other mobile device). The remote device may be configured to transmit data to the movable object 1500, receive data from the movable object 1500, transmit data to the terminal 1512, and/or receive data from the terminal 1512. Optionally, the remote device may be connected to the Internet or other telecommunications network, such that data received from the movable object 1500 and/or terminal 1512 may be uploaded to a website or server.

In some embodiments, in a simulation mode, the movable object 1500 may be physically separated from the carry 1502 and the payload 1504. The carry 1502 and the payload 1504 may be controlled by the terminal 1512 to perform the gimbal control simulation as discussed throughout the disclosure. In some embodiments, in the simulation mode, the movable object 1500 may be set to participate in the gimbal control simulation. As discussed before with respect to the drawings, a vehicle control system and a gamble control system may be operated within the moveable object 1500 to perform data fusion of the gamble control data and the position data of the moveable object such that the simulated attitude data of the gimbal could be obtained.

Figure 16:
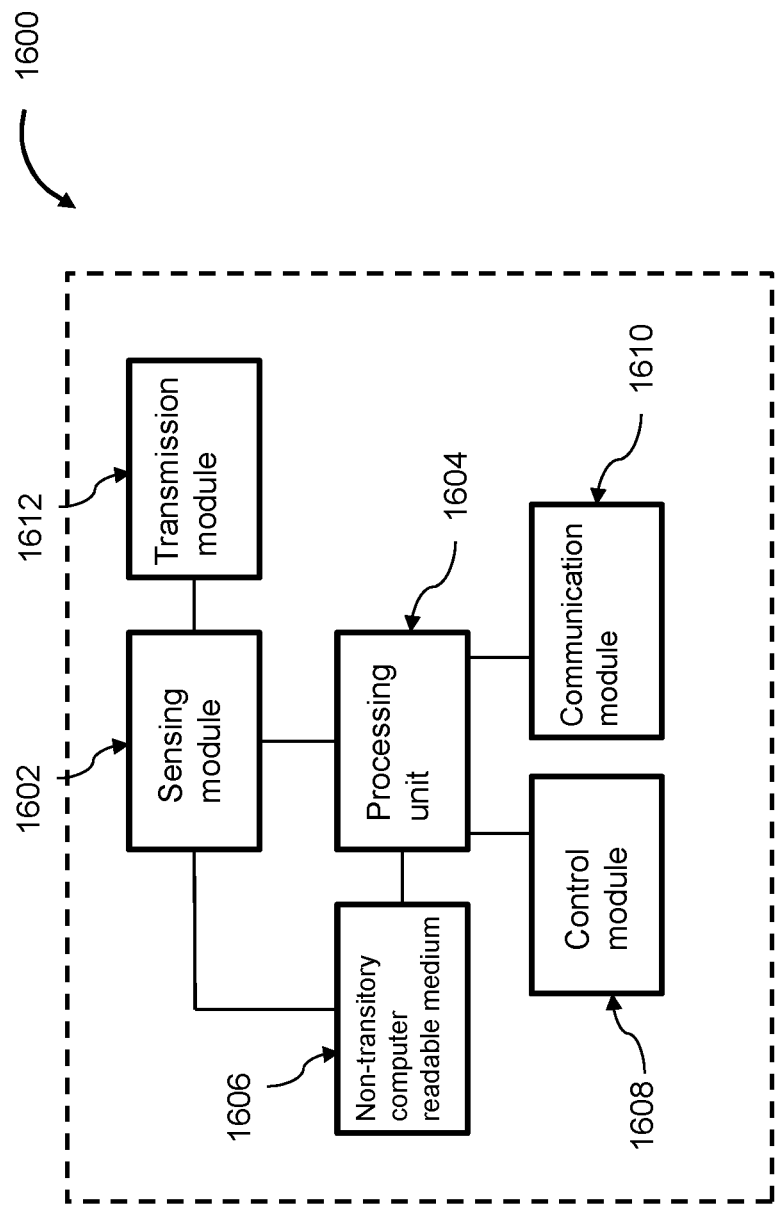
FIG. 16 is a schematic illustration by way of block diagram of a system for controlling a movable object, in accordance with an embodiment of the disclosure.

FIG. 16 is a schematic illustration by way of block diagram of a system 1600 for controlling a movable object or carrier, in accordance with embodiments. The system 1600 may be used in combination with any suitable embodiment of the systems, devices, and methods disclosed herein. The system 1600 may include a sensing module 1602, a processing unit 1604, non-transitory computer readable medium 1606, a control module 1608, and a communication module 1610.

The sensing module 1602 may utilize different types of sensors that collect information relating to the movable objects in different ways. Different types of sensors may sense different types of signals or signals from different sources. For example, the sensors may include inertial sensors, GPS sensors, proximity sensors (e.g., lidar), or vision/image sensors (e.g., a camera). The sensing module 1602 may be operatively coupled to a processing unit 1604 having a plurality of processors. In some embodiments, the sensing module 1602 may be operatively coupled to a transmission module 1612 (e.g., a Wi-Fi image transmission module) configured to directly transmit sensing data to a suitable external device or system. For example, the transmission module 1612 may be used to transmit images captured by a camera of the sensing module 1602 to a remote terminal.

The processing unit 1604 may have one or more processors, such as a programmable processor (e.g., a central processing unit (CPU)). The processing unit 1604 may be operatively coupled to a non-transitory computer readable medium 1606. The non-transitory computer readable medium 1606 may store logic, code, and/or program instructions executable by the processing unit 1604 for performing one or more steps as discussed before. The non-transitory computer readable medium may include one or more memory units (e.g., removable media or external storage such as an SD card or random access memory (RAM)). In some embodiments, data from the sensing module 1602 may be directly conveyed to and stored within the memory units of the non-transitory computer readable medium 1606. The memory units of the non-transitory computer readable medium 1606 may store logic, code and/or program instructions executable by the processing unit 1604 to perform any suitable embodiment of the methods described herein. For example, the processing unit 1604 may be configured to execute instructions causing one or more processors of the processing unit 1604 to analyze sensing data produced by the sensing module 1602. The memory units may store sensing data from the sensing module 1602 to be processed by the processing unit 1604. In some embodiments, the memory units of the non-transitory computer readable medium 1606 may be used to store the processing results produced by the processing unit 1604.

In some embodiments, the processing unit 1604 may be operatively coupled to a control module 1608 configured to control a state of the movable object. For example, the control module 1608 may be configured to control the propulsion mechanisms of the movable object to adjust the spatial disposition, velocity, and/or acceleration of the movable object with respect to six degrees of freedom. Alternatively or in combination, the control module 1608 may control one or more of a state of a carrier, payload, or sensing module.

The processing unit 1604 may be operatively coupled to a communication module 1610 configured to transmit and/or receive data from one or more external devices (e.g., a terminal, display device, or other remote controller). Any suitable means of communication may be used, such as wired communication or wireless communication. For example, the communication module 1610 may utilize one or more of local area networks ("LANs"), wide area networks ("WANs"), infrared, radio, WiFi, point-to-point ("P2P") networks, telecommunication networks, cloud communication, and the like. Optionally, relay stations, such as towers, satellites, or mobile stations, may be used. Wireless communications may be proximity dependent or proximity independent. In some embodiments, line-of-sight may or may not be required for communications. The communication module 1610 may transmit and/or receive one or more of sensing data from the sensing module 1602, processing results produced by the processing unit 1604, predetermined control data, user commands from a terminal or remote controller, and the like.

The components of the system 1600 may be arranged in any suitable configuration. For example, one or more of the components of the system 1600 may be located on the movable object, carrier, payload, terminal, sensing system, or an additional external device in communication with one or more of the above. Additionally, although FIG. 16 depicts a single processing unit 1604 and a single non-transitory computer readable medium 1606, one of skill in the art would appreciate that this is not intended to be limiting, and that the system 1600 may include a plurality of processing units and/or non-transitory computer readable media. In some embodiments, one or more of the plurality of processing units and/or non-transitory computer readable media may be situated at different locations, such as on the movable object, carrier, payload, terminal, sensing module, additional external device in communication with one or more of the above, or suitable combinations thereof, such that any suitable aspect of the processing and/or memory functions performed by the system 1600 may occur at one or more of the aforementioned locations.

While some embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A gimbal on-board a vehicle, comprising:
a receiver, configured to receive a gimbal mode signal indicative of whether the gimbal is to be in an active mode or a simulation mode;
a gimbal control system configured to:
receive gimbal control data from a remote control system, and generate gimbal response data based on the gimbal control data from the remote control system; and
in response to the gimbal being in the simulation mode, receive position data describing a simulated attitude of the vehicle generated from a vehicle control system on-board the vehicle and generate simulated gimbal response data based on the gimbal control data and the position data, the position data being at least partially based on simulated weather data; and
one or more actuators configured to adjust an arrangement of the gimbal when the gimbal is in the active mode, or remain dormant and not adjust the arrangement of the gimbal when the gimbal is in the simulation mode.

2. The gimbal of claim 1 wherein the simulated gimbal response data includes simulated gimbal state information which represents an attitude of the gimbal relative to the vehicle.

3. The gimbal of claim 2 wherein the simulated gimbal state information includes simulated visual data captured by a camera fitted in the gimbal.

4. The gimbal of claim 2 wherein the simulated gimbal state information further includes an orientation of a camera carried by the gimbal.

5. The gimbal of claim 1 wherein the simulated gimbal response data is transmitted to a display device that displays a visual illustration of the gimbal in an orientation described by the simulated gimbal response data.

6. The gimbal of claim 1 wherein the position data is further partially based on simulated orientation of the vehicle.

7. The gimbal of claim 1 wherein the position data is further partially based on position data describing the simulated attitude of the vehicle which includes at least one of rotation of the vehicle about a pitch axis, rotation of the vehicle about a yaw axis, or rotation of the vehicle about a roll axis.

8. The gimbal of claim 1 wherein the one or more actuators permit rotation of one or more frame components of the gimbal about an axis in the active mode.

9. The gimbal of claim 1 wherein the gimbal mode signal is generated at the remote control system remote to the vehicle or generated in response to a user input indicating a selection between the active mode and the simulation mode.

10. The gimbal of claim 1 wherein the vehicle is an unmanned aerial vehicle (UAV).

11. A method of operating a gimbal on-board a vehicle, said method comprising:
receiving a gimbal mode signal indicative of whether the gimbal is to be in an active mode or a simulation mode;
receiving gimbal control data from a remote control system;
generating, at a gimbal control system, gimbal response data based on the gimbal control data from the remote control system, wherein the gimbal response data is communicated to one or more actuators configured to adjust an arrangement of the gimbal when the gimbal is in the active mode and is not communicated to the one or more actuators when the gimbal is in the simulation mode; and
in response to the gimbal being in the simulation mode, receive position data describing a simulated attitude of the vehicle generated from a vehicle control system on-board the vehicle and generate simulated gimbal response data based on the gimbal control data and the position data, the position data being at least partially based on simulated weather data.

12. The method of claim 11 wherein the simulated gimbal response data includes simulated gimbal state information which represents an attitude of the gimbal relative to the vehicle.

13. The method of claim 12 wherein the simulated gimbal state information includes simulated visual data captured by a camera fitted in the gimbal.

14. The method of claim 12 wherein the simulated gimbal state information further includes an orientation of a camera carried by the gimbal.

15. The method of claim 11, further comprising:
transmitting the simulated gimbal response data to a display device that displays a visual illustration of the gimbal in an orientation described by the simulated gimbal response data.

16. The method of claim 11 wherein the position data is further partially based on simulated orientation of the vehicle.

17. The method of claim 11 wherein the position data is further partially based on position data describing the simulated attitude of the vehicle which includes at least one of rotation of the vehicle about a pitch axis, rotation of the vehicle about a yaw axis, or rotation of the vehicle about a roll axis.

18. The method of claim 11 wherein the one or more actuators permit rotation of one or more frame components of the gimbal about an axis in the active mode.

19. The method of claim 11 wherein the gimbal mode signal is generated at the remote control system remote to the vehicle or generated in response to a user input indicating a selection between the active mode and the simulation mode.

20. The method of claim 11 wherein the vehicle is an unmanned aerial vehicle (UAV).

* * * * *